(12) United States Patent
Suzuki

(10) Patent No.: US 7,712,356 B2
(45) Date of Patent: May 11, 2010

(54) MISFIRE DETERMINATION SYSTEM AND METHOD FOR INTERNAL COMBUSTION ENGINE, VEHICLE INCLUDING MISFIRE DETERMINATION SYSTEM FOR INTERNAL COMBUSTION ENGINE, AND SYSTEM FOR AND METHOD OF ESTIMATING RIGIDITY OF TORSION ELEMENT

(75) Inventor: Takashi Suzuki, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 8 days.

(21) Appl. No.: 12/330,682

(22) Filed: Dec. 9, 2008

(65) Prior Publication Data

US 2009/0151469 A1 Jun. 18, 2009

(30) Foreign Application Priority Data

Dec. 12, 2007 (JP) ............................. 2007-321002

(51) Int. Cl.
*G01M 15/11* (2006.01)
(52) U.S. Cl. .................................................. 73/114.04
(58) Field of Classification Search .............. 73/114.02, 73/114.04, 114.05, 114.11
See application file for complete search history.

(56) References Cited

U.S. PATENT DOCUMENTS

| | | | | |
|---|---|---|---|---|
| 6,298,717 B1 * | 10/2001 | Nishimura | ................ | 73/114.04 |
| 6,732,708 B2 * | 5/2004 | Nishizawa et al. | ..... | 123/406.13 |
| 6,962,224 B2 * | 11/2005 | Nakanowatari | ........ | 180/65.225 |
| 7,503,207 B2 * | 3/2009 | Nishigaki et al. | ........ | 73/114.02 |
| 7,503,208 B2 * | 3/2009 | Akimoto et al. | .......... | 73/114.03 |
| 7,536,902 B2 * | 5/2009 | Tsukamoto et al. | ...... | 73/114.04 |
| 7,543,483 B2 * | 6/2009 | Akimoto et al. | .......... | 73/114.03 |
| 7,631,710 B2 * | 12/2009 | Utsumi | .................... | 180/65.21 |
| 2003/0173123 A1 * | 9/2003 | Nakanowatari | ............ | 180/65.2 |
| 2007/0101806 A1 * | 5/2007 | Yamaguchi | ................. | 73/117.3 |
| 2007/0261484 A1 * | 11/2007 | Nishigaki et al. | ........... | 73/117.3 |
| 2008/0148835 A1 * | 6/2008 | Akimoto et al. | .......... | 73/116.01 |
| 2008/0196485 A1 * | 8/2008 | Akimoto et al. | .......... | 73/114.02 |
| 2009/0145210 A1 * | 6/2009 | Suzuki | .................... | 73/114.04 |
| 2009/0308145 A1 * | 12/2009 | Suzuki | .................... | 73/114.04 |

FOREIGN PATENT DOCUMENTS

JP 2001-065402 A 3/2001

* cited by examiner

*Primary Examiner*—Lisa M. Caputo
*Assistant Examiner*—Freddie Kirkland, III
(74) *Attorney, Agent, or Firm*—Kenyon & Kenyon LLP

(57) ABSTRACT

An internal-combustion-engine misfire determination system includes: detection sections that detects the rotational speeds of the output shaft and the downstream shaft; a rigidity estimation section that performs a rigidity estimation process in which frequency components caused by a resonance due to torsion of the torsion element are extracted from the rotational speeds, and the rigidity of the torsion element is estimated based on a value obtained by comparing amplitudes of both of the extracted frequency components and on the detected output shaft rotational speed; a resonance influence component calculation section that calculates a resonance influence component caused by an influence of the resonance on the output shaft rotational speed; and a misfire determination section that determines the occurrence of the misfire in the internal combustion engine based on a rotational speed for determination that is obtained by subtracting the calculated resonance influence component from the output shaft rotational speed.

22 Claims, 11 Drawing Sheets

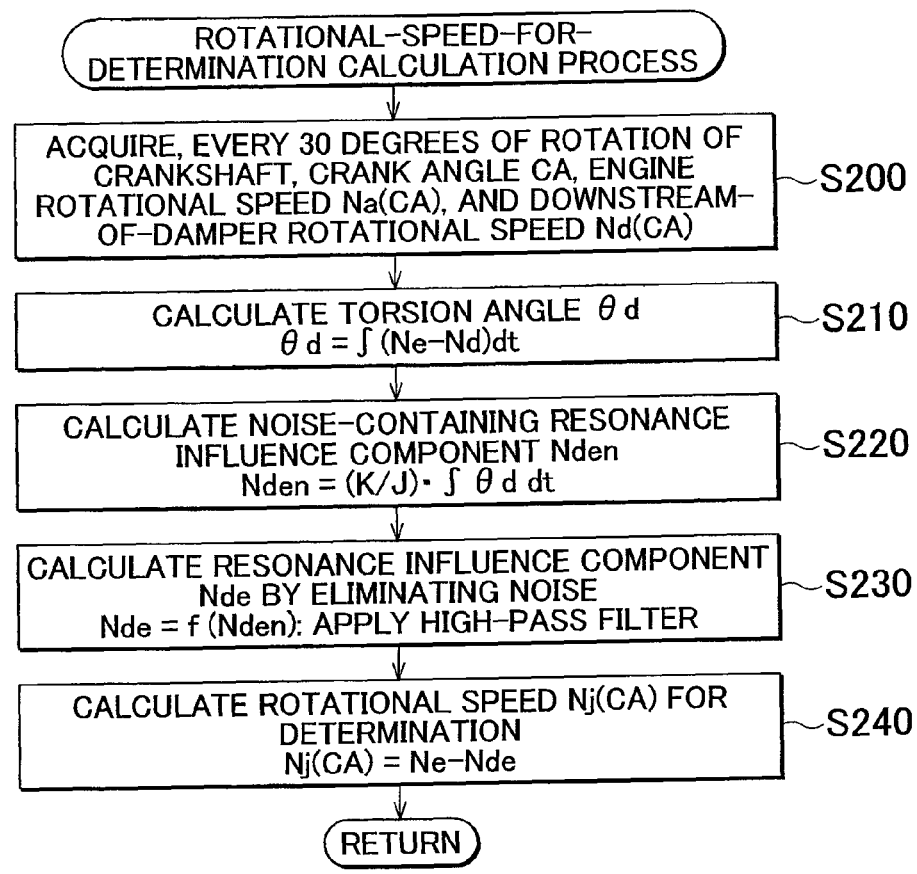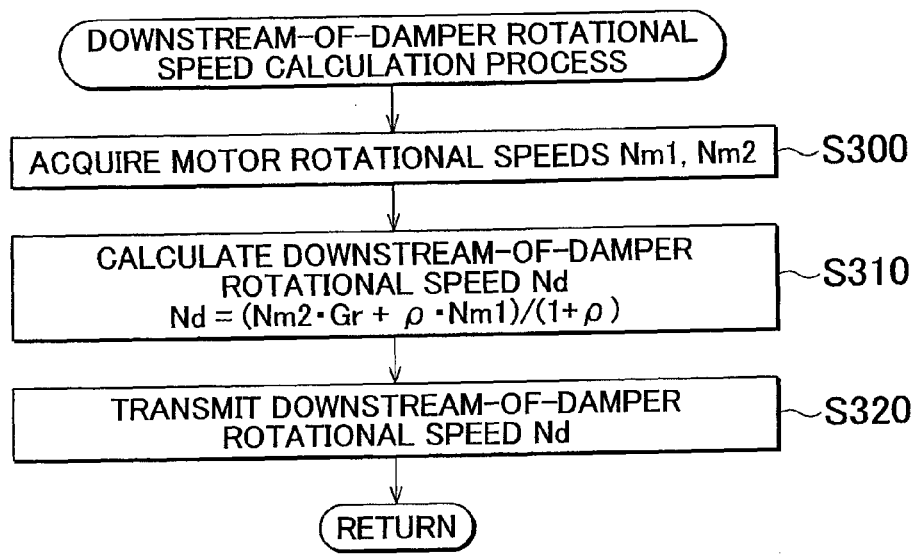

MISFIRE DETERMINATION SYSTEM AND METHOD FOR INTERNAL COMBUSTION ENGINE, VEHICLE INCLUDING MISFIRE DETERMINATION SYSTEM FOR INTERNAL COMBUSTION ENGINE, AND SYSTEM FOR AND METHOD OF ESTIMATING RIGIDITY OF TORSION ELEMENT

INCORPORATION BY REFERENCE

The disclosure of Japanese Patent Application No 2007-321002 filed on Dec. 12, 2007 including the specification, drawings and abstract is incorporated herein by reference in its entirety.

BACKGROUND OF THE INVENTION

1. Field of the Invention

The invention relates to a misfire determination system for an internal combustion engine, a vehicle, a system for estimating the rigidity of a torsion element, a misfire determination method for an internal combustion engine, and a method of estimating the rigidity of a torsion element. More specifically, the invention relates to an internal-combustion-engine misfire determination system for determining the occurrence of a misfire in a multi-cylinder internal combustion engine of which the output shaft is connected, through a torsion element, to a downstream shaft downstream of the torsion element, a vehicle including such a misfire determination system, a system for estimating the rigidity of a torsion element that is interposed between the output shaft of a multi-cylinder internal combustion engine and a downstream shaft, a misfire determination method for determining the occurrence of a misfire in an internal combustion engine, and a method of estimating the rigidity of a torsion element.

2. Description of the Related Art

A misfire determination system for an internal combustion engine has been proposed that, in a vehicle in which vibration control is performed using an electric motor so as to cancel fluctuation in torque (rotational fluctuation) of a crankshaft of an engine, calculates the amount of adjustment of torque that is output from the electric motor for vibration control, and detects misfiring in the engine based on the amount of adjustment of torque made by the electric motor (see Japanese Patent Application Publication No. 2001-65402 (JP-A-2001-65402), for example).

In a misfire determination system installed in a vehicle in which a damper (torsion element) is interposed between the crankshaft of the engine and a downstream shaft, fluctuation in torque of the crankshaft due to explosive combustion in the engine induces resonance of the torsion element and the downstream components including the torsion element. The resonance causes rotational fluctuation of the crankshaft, and as a result, even when it is tried to detect the occurrence of a misfire in one of the cylinders of the engine based on the rotational fluctuation of the crankshaft, the occurrence of a misfire cannot be accurately detected. The rotational fluctuation of the crankshaft that is caused by resonance is affected by the rotational speed of the crankshaft and the rotational speed of the downstream shaft, and in addition, affected by the rigidity (spring constant) of the torsion element. The manufacturing error and the chronological change are large with respect to the spring constant of the torsion element, and it is therefore desirable to accurately estimate the spring constant when the rotational fluctuation of the crankshaft caused by resonance is analyzed.

SUMMARY OF THE INVENTION

Torsion-element rigidity estimation system and method according to the invention accurately estimate a rigidity of a torsion element that is interposed between an output shaft of a multi-cylinder internal combustion engine and a downstream shaft. In addition, internal-combustion-engine misfire determination system and method, and a vehicle according to the invention accurately determine the occurrence of a misfire in an internal combustion engine with the use of such a rigidity of the torsion element.

A first aspect of the invention relates to an internal-combustion-engine misfire determination system. The internal-combustion-engine misfire determination system is an internal-combustion-engine misfire determination system for determining the occurrence of a misfire in a multi-cylinder internal combustion engine, of which an output shaft is connected, through a torsion element, to a downstream shaft downstream of the torsion element. The internal-combustion-engine misfire determination system includes: an output-shaft rotational speed detection section that detects an output shaft rotational speed that is the rotational speed of the output shaft; a downstream shaft rotational speed detection section that detects a downstream shaft rotational speed that is the rotational speed of the downstream shaft; a rigidity estimation section that estimates a rigidity of the torsion element based on the output shaft rotational speed and the downstream shaft rotational speed; and a misfire determination section that determines the occurrence of the misfire in the internal combustion engine based on the detected output shaft rotational speed and the estimated rigidity of the torsion element.

The rigidity estimation section may perform a rigidity estimation process in which a frequency component caused by a resonance due to torsion of the torsion element is extracted from the detected output shaft rotational speed, a frequency component caused by the resonance is extracted from the detected downstream shaft rotational speed, and the rigidity of the torsion element is estimated based on a value obtained by comparing amplitudes of both of the extracted frequency components and on the detected output shaft rotational speed.

The internal-combustion-engine misfire determination system may further include a resonance influence component calculation section that calculates a resonance influence component caused by an influence of the resonance on the output shaft rotational speed based on the estimated rigidity of the torsion element, the detected output shaft rotational speed, and the detected downstream shaft rotational speed, and the misfire determination section determines the occurrence of the misfire in the internal combustion engine based on a rotational speed for determination that is obtained by subtracting the calculated resonance influence component from the detected output shaft rotational speed.

According to the above aspect, a frequency component caused by a resonance due to torsion of the torsion element is extracted from an output shaft rotational speed that is the rotational speed of the output shaft, a frequency component caused by the resonance is extracted from a downstream shaft rotational speed that is the rotational speed of the downstream shaft, the rigidity of the torsion element is estimated based on a value obtained by comparing amplitudes of both of the extracted frequency components and on the output shaft rotational speed, a resonance influence component caused by an influence of a resonance on the output shaft rotational speed is calculated based on the estimated rigidity of the torsion element, the output shaft rotational speed and the downstream shaft rotational speed, and the occurrence of the misfire in the internal combustion engine is determined based on a rotational speed for determination that is obtained by subtracting the calculated resonance influence component from the output shaft rotational speed. The rigidity of the torsion element is estimated by extracting the frequency component, caused by the resonance, of the output shaft rotational speed and the frequency component, caused by the resonance, of the downstream shaft rotational speed and comparing the amplitudes of both of the extracted frequency components, so that it is possible to accurately estimate the rigidity of the torsion element even when a manufacturing error and/or a chronological change occurs in the torsion element. In addition, because a resonance influence component caused by the influence of a resonance due to torsion of the torsion element on the output shaft rotational speed is calculated based on the thus estimated rigidity of the torsion element, the output shaft rotational speed and the downstream shaft rotational speed, and the occurrence of the misfire in the internal combustion engine is determined based on a rotational speed for determination that is obtained by subtracting the calculated resonance influence component from the output shaft rotational speed, it is possible to accurately determine the occurrence of a misfire in the internal combustion engine even when the resonance due to torsion of the torsion element occurs.

A second aspect of the invention relates to a vehicle, the vehicle including: a multi-cylinder internal combustion engine, of which an output shaft is connected, through a torsion element, to a downstream shaft downstream of the torsion element; and the internal-combustion-engine misfire determination system according to the first aspect.

The above aspect also brings about the effects brought about by the above internal-combustion-engine misfire determination system according to the first aspect, that is, for example, it is possible to accurately estimate the rigidity of the torsion element even when a manufacturing error and/or a chronological change occurs in the torsion element, and it is possible to accurately determine the occurrence of a misfire in the internal combustion engine even when resonance due to torsion of the torsion element occurs.

A third aspect of the invention relates to a torsion-element rigidity estimation system. The torsion-element rigidity estimation system estimates a rigidity of a torsion element that is interposed between an output shaft of a multi-cylinder internal combustion engine and a downstream shaft. The torsion-element rigidity estimation system includes: an output-shaft rotational speed detection section that detects an output shaft rotational speed that is the rotational speed of the output shaft; a downstream shaft rotational speed detection section that detects a downstream shaft rotational speed that is the rotational speed of the downstream shaft; and a rigidity estimation section that extracts a resonance frequency component caused by torsion of the torsion element from the detected output shaft rotational speed, extracts the resonance frequency component from the detected downstream shaft rotational speed, and estimates the rigidity of the torsion element based on a value obtained by comparing amplitudes of both of the extracted frequency components and on the detected output shaft rotational speed.

According to the above aspect, a frequency component caused by a resonance due to torsion of the torsion element is extracted from an output shaft rotational speed that is the rotational speed of the output shaft, a frequency component caused by the resonance is extracted from a downstream shaft rotational speed that is the rotational speed of the downstream shaft, and the rigidity of the torsion element is estimated based on a value obtained by comparing amplitudes of both of the extracted frequency components and on the output shaft rotational speed. Thus, it is possible to more properly estimate the rigidity of the torsion element even when a manufacturing error and/or a chronological change occurs in the torsion element.

A fourth aspect of the invention relates to an internal-combustion-engine misfire determination method. The internal-combustion-engine misfire determination method is an internal-combustion-engine misfire determination method for determining the occurrence of a misfire in a multi-cylinder internal combustion engine, of which an output shaft is connected, through a torsion element, to a downstream shaft downstream of the torsion element. The internal-combustion-engine misfire determination method extracts a frequency component caused by a resonance due to torsion of the torsion element from an output shaft rotational speed that is the rotational speed of the output shaft, extracts a frequency component caused by the resonance from a downstream shaft rotational speed that is the rotational speed of the downstream shaft, estimates the rigidity of the torsion element based on a value obtained by comparing amplitudes of both of the extracted frequency components and on the output shaft rotational speed, calculates a resonance influence component caused by an influence of a resonance on the output shaft rotational speed, based on the estimated rigidity of the torsion element, the output shaft rotational speed and the downstream shaft rotational speed, and determines the occurrence of the misfire in the internal combustion engine based on a rotational speed for determination that is obtained by subtracting the calculated resonance influence component from the output shaft rotational speed.

According to the above aspect, a frequency component caused by a resonance due to torsion of the torsion element is extracted from an output shaft rotational speed that is the rotational speed of the output shaft, a frequency component caused by the resonance is extracted from a downstream shaft rotational speed that is the rotational speed of the downstream shaft, the rigidity of the torsion element is estimated based on a value obtained by comparing amplitudes of both of the extracted frequency components and on the output shaft rotational speed, a resonance influence component caused by an influence of a resonance on the output shaft rotational speed is calculated based on the estimated rigidity of the torsion element, the output shaft rotational speed and the downstream shaft rotational speed, and the occurrence of the misfire in the internal combustion engine is determined based on a rotational speed for determination that is obtained by subtracting the calculated resonance influence component from the output shaft rotational speed. The rigidity of the torsion element is estimated by extracting the frequency component, caused by the resonance, of the output shaft rotational speed and the frequency component, caused by the resonance, of the downstream shaft rotational speed, and it is therefore possible to accurately estimate the rigidity of the torsion element even when a manufacturing error and/or a chronological change occurs in the torsion element. In addition, because a resonance influence component caused by the influence of a resonance due to torsion of the torsion element on the output shaft rotational speed is calculated based on the thus estimated rigidity of the torsion element, the output shaft rotational speed and the downstream shaft rotational speed, and the occurrence of the misfire in the internal combustion engine is determined based on a rotational speed for determination that is obtained by subtracting the calculated resonance influence component from the output shaft rotational speed, it is possible to accurately determine the occurrence of a misfire in the internal combustion engine even when the resonance due to torsion of the torsion element occurs. A fifth aspect of the invention relates to a torsion-element rigidity estimation method. The torsion-element rigidity estimation method is a torsion-element rigidity estimation method that estimates a rigidity of a torsion element that is interposed between an output shaft of a multi-cylinder internal combustion engine and a downstream shaft. The torsion-element rigidity estimation method extracts a frequency component caused by a resonance due to torsion of the torsion element from an output shaft rotational speed that is the rotational speed of the output shaft, extracts a frequency component caused by the resonance from a downstream shaft rotational speed that is the rotational speed of the downstream shaft, and estimates a rigidity of the torsion element based on a value obtained by comparing amplitudes of both of the extracted frequency components and on the output shaft rotational speed.

According to the above aspect, a frequency component caused by a resonance due to torsion of the torsion element is extracted from an output shaft rotational speed that is the rotational speed of the output shaft, a frequency component caused by the resonance is extracted from a downstream shaft rotational speed that is the rotational speed of the downstream shaft, and the rigidity of the torsion element is estimated based on a value obtained by comparing amplitudes of both of the extracted frequency components and on the output shaft rotational speed. Thus, it is possible to more properly estimate the rigidity of the torsion element even when a manufacturing error and/or a chronological change occurs in the torsion element.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 4 is a flow chart showing an example of a rotational-speed-for-determination calculation process performed by the engine ECU;

FIG. 5 is a flow chart showing an example of a down-stream-of-damper rotational speed calculation process performed by an electronic control unit for a hybrid system;

DETAILED DESCRIPTION OF EMBODIMENT

Figure 1:
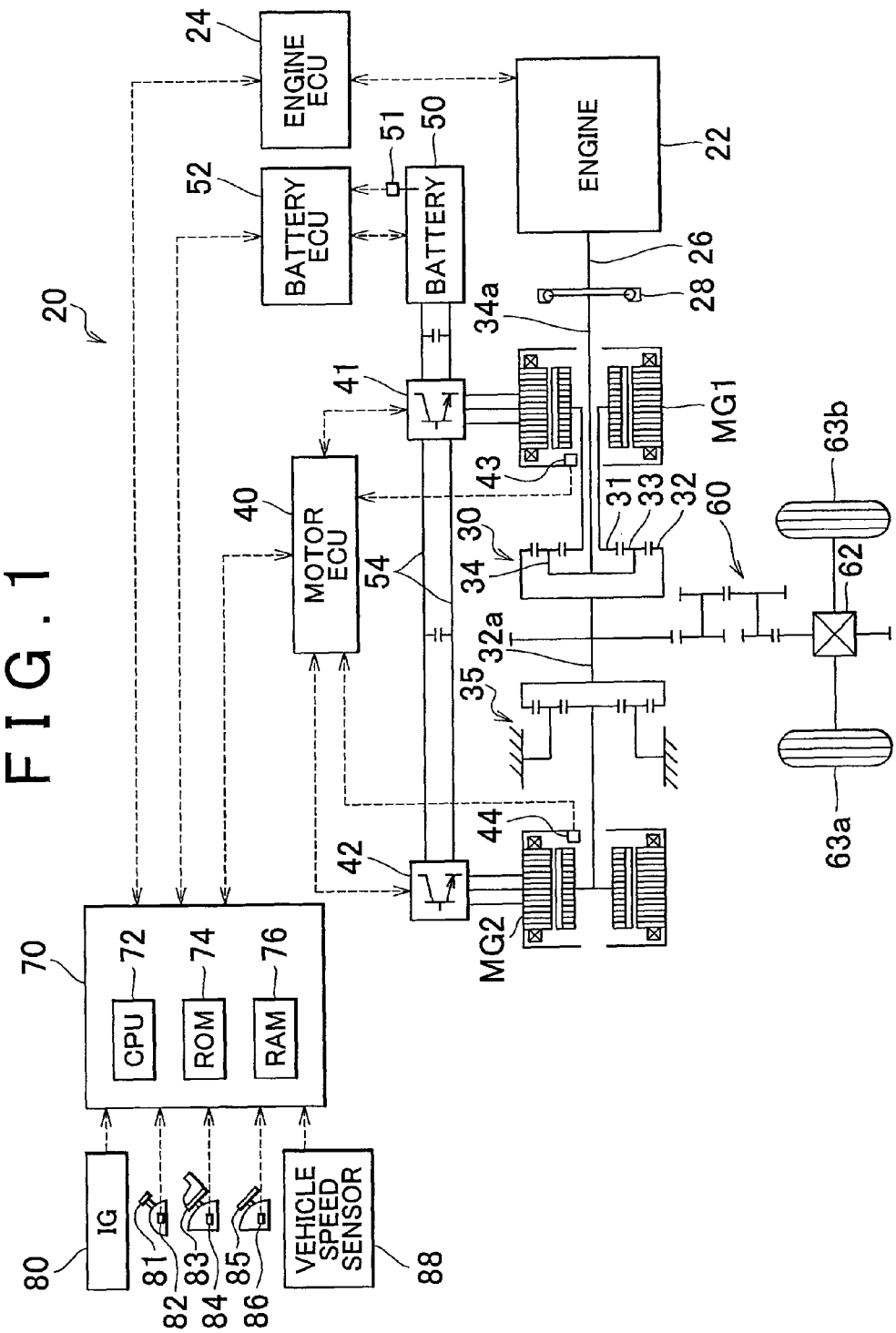
FIG. 1 is a configuration diagram showing an outline of a configuration of a hybrid car in which an internal-combustion-engine misfire determination system according to an embodiment of the invention is installed.

Modes for carrying out the invention will be described below using embodiments. FIG. 1 is a configuration diagram showing an outline of a configuration of a hybrid car 20 in which a misfire determination system for an internal combustion engine according to an embodiment of the invention is installed. As shown in FIG. 1, the hybrid car 20 of this embodiment includes: an engine 22; a three-axis power distribution/integration mechanism 30 that is connected to a crankshaft 26, which serves as an output shaft of the engine 22, through a damper 28, which serves as a torsion element; a motor MG1 capable of generating electricity that is connected to the power distribution/integration mechanism 30; a speed reduction gear 35 fixed to a ring gear shaft 32a that is connected to the power distribution/integration mechanism 30; a motor MG2 connected to the speed reduction gear 35; and an electronic control unit 70 for a hybrid system (hereinafter referred to as the hybrid ECU 70), which controls the whole vehicle. An electronic control unit 24 for an engine, which mainly controls the engine 22, a crank position sensor 140, which detects the rotational position of the crankshaft 26 of the engine 22, described later, and rotational position detection sensors 43, 44, which detect the rotational positions of the motors MG1, MG2, function as the misfire determination system for an internal combustion engine of this embodiment.

Figure 2:
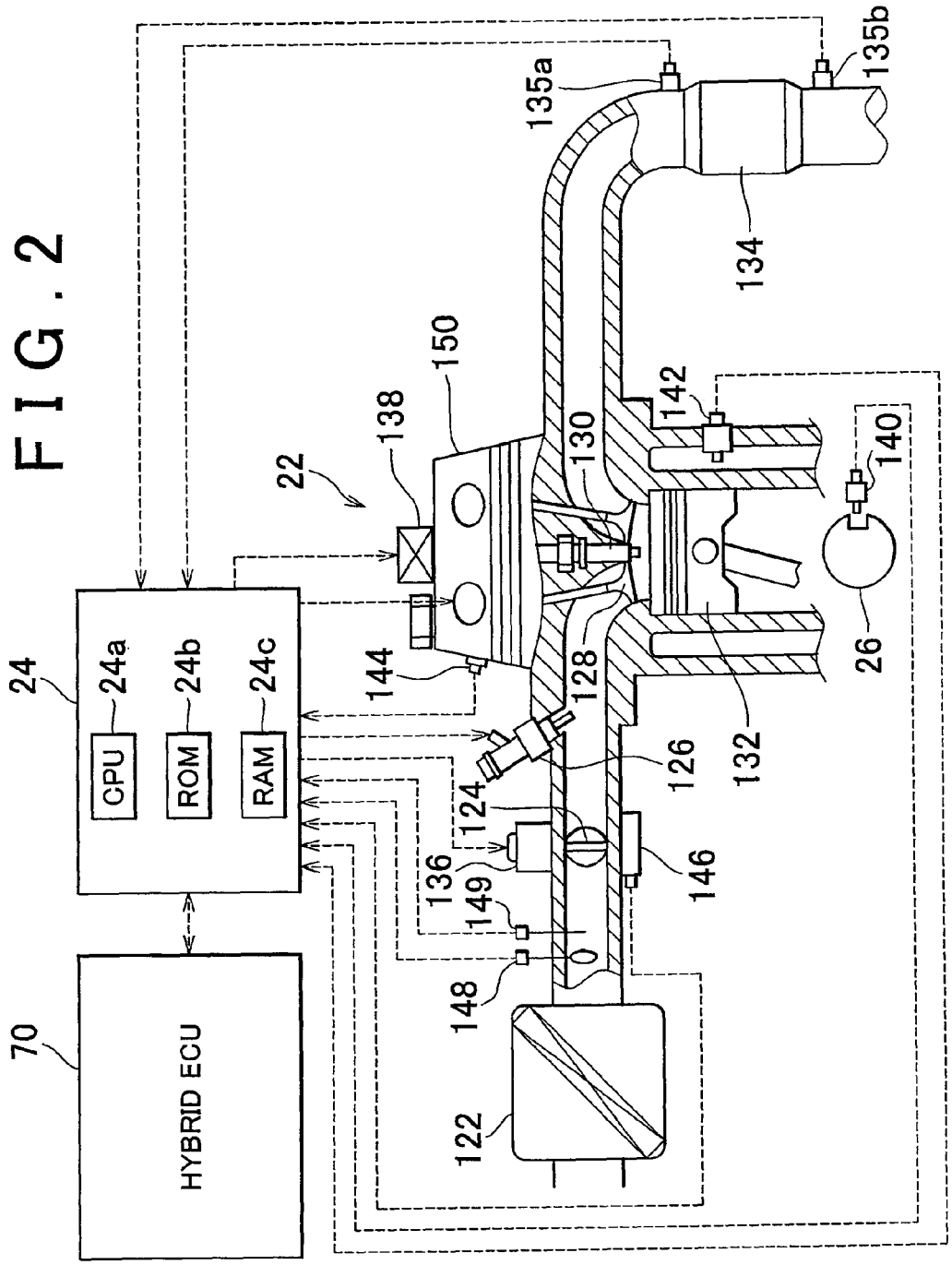
FIG. 2 is a configuration diagram showing an outline of a configuration of an engine.

The engine 22 is an eight-cylinder internal combustion engine capable of outputting mechanical power using hydrocarbon fuel, such as gasoline or light oil, for example. As shown in FIG. 2, in the engine 22, air cleaned by an air cleaner 122 is taken in through a throttle valve 124, the intake air and gasoline are mixed by injecting gasoline from a fuel injection valve 126 provided for each cylinder, the mixture is taken into a combustion chamber through an intake valve 128 and explosively combusted by the electric spark of an ignition plug 130, and the reciprocation motion of a piston 132 that is pushed down by the energy of the combustion is converted into the rotational motion of the crankshaft 26. The exhaust gas from the engine 22 is discharged into the outside through a purification device (three-way catalyst) 134 that removes harmful components, such as carbon monoxide (CO), hydrocarbon (HC), and nitrogen oxide (NOx).

The engine 22 is controlled by the electronic control unit 24 for an engine (hereinafter, referred to as the engine ECU 24). The engine ECU 24 is a microprocessor including a CPU 24a as a main component, and includes, in addition to the CPU 24a, a ROM 24b for storing processing programs, a RAM 24c for temporarily storing data, and input and output ports and a communication port (not shown). Supplied to the engine ECU 24 through the input port are signals from various sensors for detecting status values of the engine 22, that is, a signal indicating the crank position (crank angle CA) from the crank position sensor 140 for detecting the rotational position (crank angle CA) of the crankshaft 26, a signal indicating the coolant temperature from a coolant temperature sensor 142 for detecting the temperature of coolant of the engine 22, a signal indicating the cam position from a cam position sensor 144 for detecting the rotational position of a cam shaft for opening/closing the intake valve 128 and exhaust valve for taking and discharging gas into and from the combustion chamber, a signal indicating the throttle position from a throttle valve position sensor 146 for detecting the position of the throttle valve 124, a signal indicating the intake air amount Q from an air flow meter 148 that is attached in an intake pipe, a signal indicating the temperature of the intake air from a temperature sensor 149 that is also attached in the intake pipe, a signal indicating the air/fuel ratio AF from an air/fuel ratio sensor 135a, and a signal indicating oxygen concentration from an oxygen sensor 135b. On the other hand, output from the engine ECU 24 through the output port are various control signals for driving the engine 22, that is, for example, a drive signal to be sent to the fuel injection valve 126, a drive signal to be sent to a throttle motor 136 for adjusting the position of the throttle valve 124, a control signal to be sent to an ignition coil 138 that is integrated with an igniter, and a control signal to be sent to a variable valve timing mechanism 150 capable of varying the open/close timing of the intake valve 128. The engine ECU 24 communicates with the hybrid ECU 70, and controls the operation of the engine 22 based on control signals from the hybrid ECU 70, and at the same time, outputs data concerning the operational status of the engine 22 as needed. The above-described crank position sensor 140 is an electromagnetic pickup sensor having a timing rotor that is fixed so as to rotate in synchronization with the crankshaft 26 and in which teeth are formed at ten-degree intervals and a void corresponding to two teeth is created for detecting the reference position. The crank position sensor 140 generates a shaped wave every time the crankshaft 26 rotates 10 degrees. The engine ECU 24 calculates, as a rotational speed Ne of the engine 22, the rotational speed during each 30-degree rotation of the crankshaft 26 based on the shaped waves received from the crank position sensor 140.

The power distribution/integration mechanism 30 includes a sun gear 31 that is an external gear, a ring gear 32 that is an internal gear arranged concentrically with the sun gear 31, a plurality of pinion gears 33 that mesh with the sun gear 31 and the ring gear 32, and a carrier 34 that rotatably and revolvably supports the plurality of pinion gears 33. The power distribution/integration mechanism 30 is thus constructed in the form of a planetary gear mechanism that effects differential operation in which the sun gear 31, the ring gear 32 and the carrier 34 are used as rotary elements. In the power distribution/integration mechanism 30, the crankshaft 26 of the engine 22 is connected, through the damper 28, to a carrier shaft 34a that is connected to the carrier 34, the motor MG1 is connected to the sun gear 31, and the speed reduction gear 35 is connected to the ring gear 32 through the ring gear shaft 32a. The power distribution/integration mechanism 30 distributes the mechanical power that is input from the engine 22 through the carrier 34, to the sun gear 31 side and the ring gear 32 side according to the gear ratio when the motor MG1 functions as an electric generator, and on the other hand, the power distribution/integration mechanism 30 integrates the mechanical power that is input from the engine 22 through the carrier 34 and the mechanical power that is input from the motor MG1 through the sun gear 31 and outputs the integrated mechanical power to the ring gear 32 side when the motor MG1 functions as an electric motor. The mechanical power output to the ring gear 32 is ultimately output to driving wheels 63a, 63b of the vehicle through the ring gear shaft 32a, a gear mechanism 60 and a differential gear 62.

The motors MG1 and MG2 are known synchronous generator/motors that operate as electric generators and electric motors, and exchange electric power with a battery 50 through inverters 41, 42. Electric power lines 54 that connect the battery 50 and the inverters 41, 42 are a positive bus and a negative bus that are shared by the inverters 41, 42, so that the electric power generated by one of the motor MG1 and the motor MG2 can be used by the other motor. Thus, the battery 50 is charged by the electric power generated by the motor MG1 or the motor MG2 and is discharged when electric power falls short. When the input and output of electric power between the motors MG1, MG2 are balanced, the battery 50 is neither charged nor discharged. Driving of the motor MG1 and driving of the motor MG2 are both controlled by an electronic control unit 40 for motors (hereinafter, referred to as the motor ECU 40). Supplied to the motor ECU 40 are signals required to control driving of the motors MG1, MG2, that is, for example, signals from the rotational position detection sensors 43, 44 for detecting the rotational positions of the rotors of the motors MG1, MG2, and signals indicating the phase currents applied to the motors MG1, MG2 that are detected by current sensors (not shown). Switching control signals are output from the motor ECU 40 to the inverters 41, 42. The motor ECU 40 communicates with the hybrid ECU 70, and controls driving of the motors MG1, MG2 based on control signals from the hybrid ECU 70, and at the same time, outputs data concerning the operational status of the motors MG1, MG2 to the hybrid ECU 70 as needed. The rotational position detection sensors 43, 44 each include a resolver. The motor ECU 40 calculates the rotational speeds Nm1, Nm2 of the motors MG1, MG2 every predetermined time period (every 50 μs or every 100 μs, for example) based on the signals from the rotational position detection sensors 43, 44.

The battery 50 is controlled by the electronic control unit 52 for a battery (hereinafter, referred to as the battery ECU 52). Supplied to the battery ECU 52 are signals required to control the battery 50, that is, a signal indicating the voltage across terminals of the battery 50 that is output from a voltage sensor (not shown) placed between the terminals of the battery 50, a signal indicating the charging/discharging electric current that is output from a current sensor (not shown) attached to one of the electric power lines 54 connected to the output terminals of the battery 50, and a signal indicating the battery temperature Tb that is output from a temperature sensor 51 attached to the battery 50. The battery ECU 52 outputs data concerning conditions of the battery 50 to the hybrid ECU 70 via communication as needed. The battery ECU 52 also calculates the state of charge (SOC) based on the integral value of the charging/discharging electric current that is detected by the current sensor in order to control the battery 50.

The engine ECU 70 is a microprocessor including a CPU 72 as a main component, and includes, in addition to the CPU 72, a ROM 74 for storing processing programs, a RAM 76 for temporarily storing data, and input and output ports and a communication port (not shown). Supplied to the hybrid ECU 70 through the input port are an ignition signal from an ignition switch 80, a signal indicating the shift position SP from a shift position sensor 82 that detects the position of a shift lever 81, a signal indicating the accelerator pedal operation amount Acc from an acceleration pedal position sensor 84 that detects the amount of depression of an accelerator pedal 83, a signal indicating the brake pedal position BP from a brake pedal position sensor 86 that detects the amount of depression of a brake pedal 85, and a signal indicating the vehicle speed V from a vehicle speed sensor 88. The hybrid ECU 70 is connected to the engine ECU 24, the motor ECU 40, and the battery ECU 52 via the communication port, and exchanges various control signals and data with the engine ECU 24, the motor ECU 40, and the battery ECU 52.

In the hybrid car 20 of the embodiment constructed as described above, the required torque that should be output to the ring gear shaft 32a is calculated based on the accelerator pedal operation amount Acc corresponding to the amount of depression of the accelerator pedal 83 by a driver and on the vehicle speed V, and operation of the engine 22, operation of the motor MG1, and operation of the motor MG2 are controlled such that the required mechanical power corresponding to the required torque is output to the ring gear shaft 32a. Modes for controlling operation of the engine 22, the motor MG1, and the motor MG2 include: a torque conversion operation mode in which operation of the engine 22 is controlled such that the mechanical power corresponding to the required mechanical power is output from the engine 22, and operation of the motor MG1 and operation of the motor MG2 are controlled such that all the mechanical power output from the engine 22 is subjected to the torque conversion performed by the power distribution/integration mechanism 30, the motor MG1, and the motor MG2 and is output to the ring gear shaft 32a; a charge/discharge operation mode in which operation of the engine 22 is controlled so as to output a mechanical power corresponding to the sum of the required mechanical power and the electric power needed for charging/discharging of the battery 50, and operation of the motor MG1 and operation of the motor MG2 are controlled such that all of or part of the mechanical power output from the engine 22 is subjected to the torque conversion performed by the power distribution/integration mechanism 30, the motor MG1 and the motor MG2, and the required mechanical power is output to the ring gear shaft 32a, which involves charging/discharging of the battery 50; and a motor operation mode in which operation control is performed such that operation of the engine 22 is stopped and the mechanical power corresponding to the required mechanical power is output from the motor MG2 to the ring gear shaft 32a.

Figure 3:
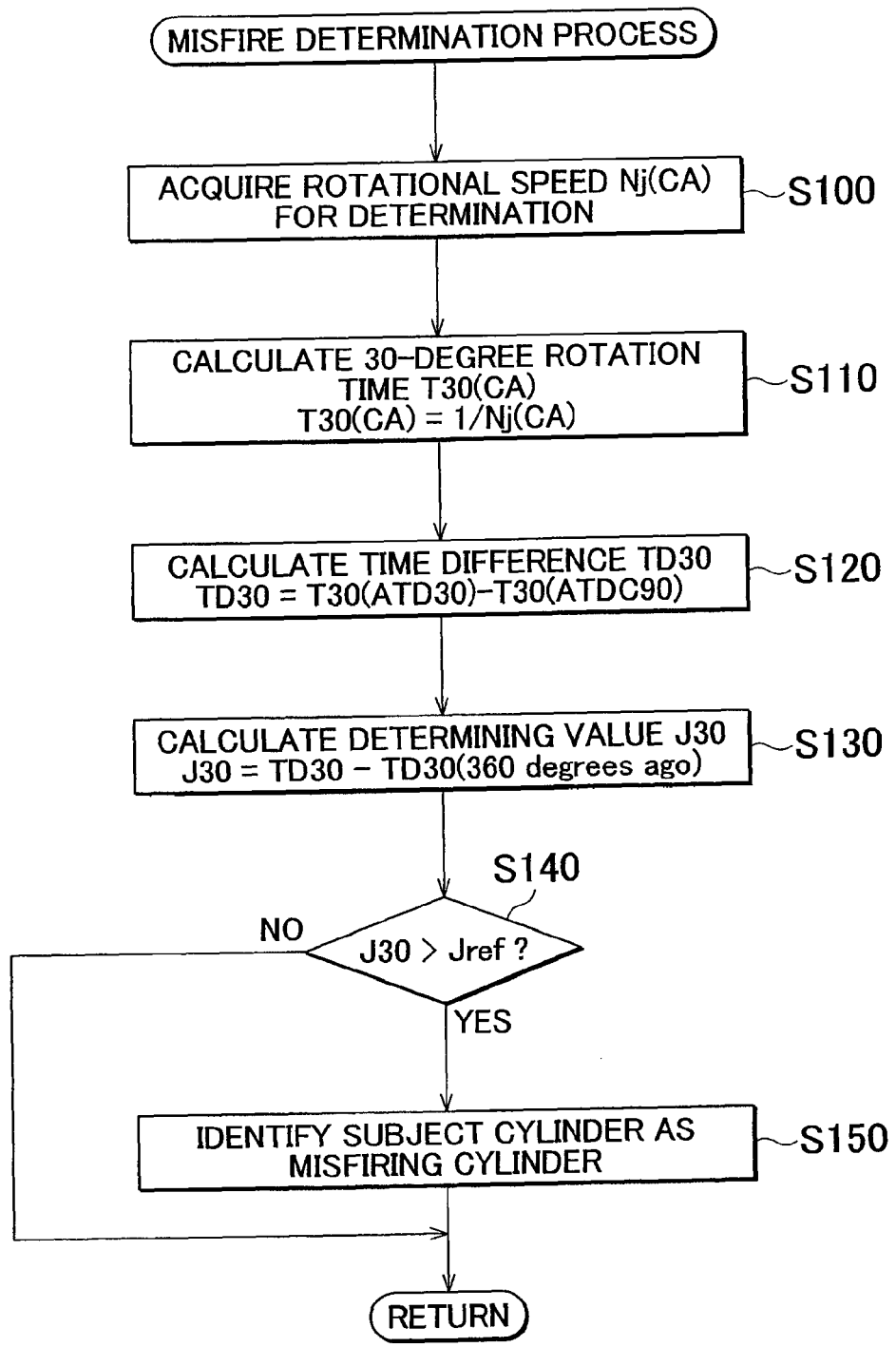
FIG. 3 is a flow chart showing an example of a misfire determination process performed by an engine ECU.

Next, an operation performed to determine whether there is a misfire in one of cylinders of the engine 22 mounted on the hybrid car 20 of the embodiment constructed as described above will be described. FIG. 3 is a flow chart showing an example of a misfire determination process performed by the engine ECU 24. This routine is repeatedly performed every predetermined time period.

When the misfire determination process is performed, the CPU 24a of the engine ECU 24 acquires a rotational speed Nj(CA) for determination (step S100), and performs a process of calculating a 30-degree rotation time T30(CA) that is required for the crankshaft 26 to rotate 30 degrees based on the reciprocal of the acquired rotational speed Nj(CA) for determination (step S110). The rotational speed Nj(CA) for determination is a rotational speed obtained by subtracting a component Nde caused by the influence of resonance (resonance influence component) due to torsion of the damper 28 from the rotational speed Ne of the engine 22. The rotational speed Nj(CA) for determination is calculated in a process of calculating the rotational speed for determination shown in FIG. 4 as an example. For convenience of explanation, the process of calculating the rotational speed Nj(CA) for determination will be described later.

Next, the difference (T30(ATDC30)−T30(ATDC90)) between the 30-degree rotation time T30(ATDC30) at the point 30 degrees after the top dead center of a compression stroke of the cylinder that is the subject of the misfire determination (ATDC30) and T30(ATDC90) at the point 90 degrees after the same top dead center (ATDC90) is calculated as a time difference TD30 (step S120), and the difference (difference between two time differences TD30s, the latter of which is calculated 360 degrees after the point at which the former is calculated)(TD30−TD30(360 degrees ago)) between the calculated time difference TD30 and the value calculated as the time difference TD30 360 degrees before the point at which the current time difference TD30 is calculated, is calculated as a determining value J30 (step S130). The calculated determining value J30 is compared with a threshold value Jref (step S140). When the determining value J30 is greater than the threshold value Jref, it is determined that there is a misfire in the subject cylinder (step S150), and the misfire determination process is exited. When the determining value J30 is equal to or less than the threshold value Jref, it is determined that there is no misfire in the subject cylinder, and the misfire determination process is exited. Considering the angles relative to the compression top dead center, and the acceleration of the piston 132 due to combustion (explosion) in the engine 22, it should be understood that the time difference TD30 has a negative value when the combustion (explosion) is normal in the cylinder, and has a positive value when there is a misfire in the cylinder. Thus, when the combustion (explosion) in the subject cylinder is normal, the determining value J30 becomes a value close to zero, and on the other hand, when there is a misfire in the subject cylinder, the determining value J30 becomes a positive value greater than the absolute value of the time difference TD30 of the cylinder in which the combustion is normal. Accordingly, when a value close to the absolute value of the time difference TD30 of the cylinder in which the combustion is normal is set as the threshold value Jref, it is possible to accurately determine the occurrence of a misfire in the subject cylinder.

Next, the process of calculating the rotational speed Nj(CA) for determination will be described. In the process of calculating the rotational speed Nj(CA) for determination, as shown in the rotational-speed-for-determination calculation process in FIG. 4, the CPU 24a of the engine ECU 24 acquires, every 30 degrees of rotation of the crankshaft, the crank angle CA, the rotational speed Ne(CA) of the engine 22, and the rotational speed on the power distribution/integration mechanism 30 side of the damper 28, that is, a rotational speed Nd(CA) downstream of the damper, which is the rotational speed of the carrier shaft 34a (step S200). Of the rotational speeds Ne of the engine 22 each calculated by the engine ECU 24 every time the crankshaft 26 rotates 30 degrees based on the shaped waves sent from the crank position sensor 140, the rotational speed at the crank angle CA is acquired as the rotational speed Ne(CA) of the engine 22. Of the rotational speeds calculated by the hybrid ECU 70 in the downstream-of-damper rotational speed calculation process shown in FIG. 5, the rotational speed at the crank angle CA is acquired as the downstream-of-damper rotational speed Nd(CA) via communication. Next, a method of calculating the downstream-of-damper rotational speed Nd(CA) will be described with reference to FIG. 5.

In the process of calculating the downstream-of-damper rotational speed Nd, as shown in the downstream-of-damper rotational speed calculation process shown in FIG. 5, the CPU 72 of the hybrid ECU 70 acquires the rotational speeds Nm1, Nm2 of the motors MG1, MG2 (step S300), and calculates the downstream-of-damper rotational speed Nd according to the following equation (1) using the acquired rotational speeds Nm1, Nm2 of the motors MG1, MG2, the gear ratio ρ of the power distribution/integration mechanism 30 (the number of teeth of the sun gear/the number of teeth of the ring gear), and the gear ratio Gr of the speed reduction gear 35 (step S310). Then, the calculated downstream-of-damper rotational speed Nd is transmitted to the engine ECU 24 (step S320), and this process is exited. The rotational speeds Nm1, Nm2 that are calculated based on the signals from the rotational position detection sensors 43, 44 are acquired via communication.

$$Nd = [Nm2 \cdot Gr + \rho \cdot Nm1]/(1+\rho) \qquad (1)$$

Figure 6:
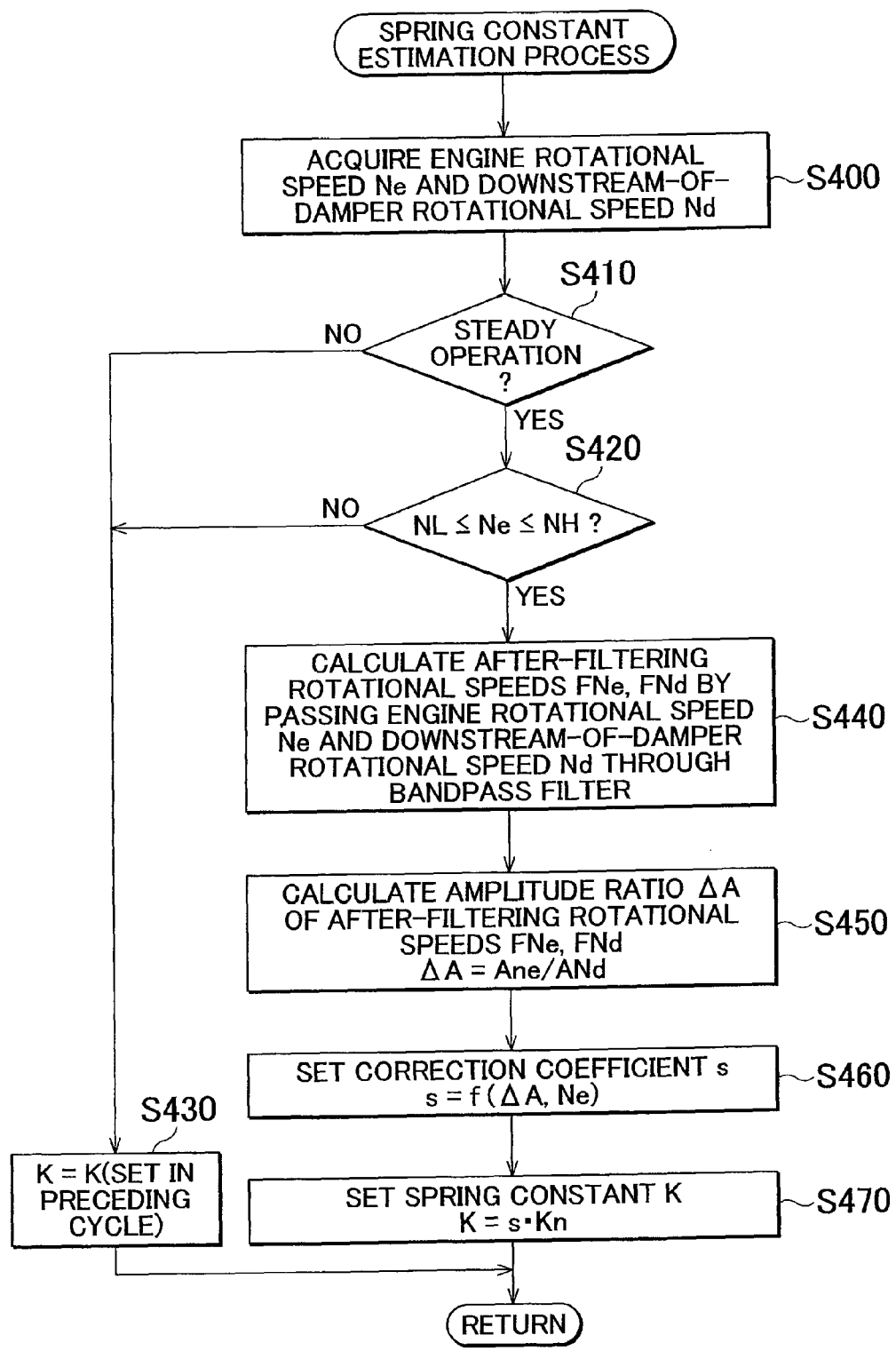
FIG. 6 is a flow chart showing an example of a spring constant estimation process performed by the engine ECU.

Returning back to FIG. 4, when the crank angle CA, the rotational speed Ne(CA) of the engine 22, and the downstream-of-damper rotational speed Nd(CA) are acquired (step S200), the torsion angle θd(CA) of the damper 28 is calculated according to the following equation (2) using the rotational speed Ne(CA) of the engine 22 and the downstream-of-damper rotational speed Nd(CA) (step S210). A noise-containing resonance influence component Nden(CA) containing low-frequency noise is then calculated as the influence of resonance of the damper 28 on the rotational speed of the engine 22, using a constant ratio (K/J) that is the ratio between the spring constant K of the damper 28 and a moment of inertia J on the engine 22 side of the damper 28 and the calculated torsion angle θd(CA) (step S220). The spring constant K that is estimated in a spring constant estimation process shown in FIG. 6 is acquired and used in this embodiment. Next, a method of calculating the spring constant K of the damper 28 will be described with reference to FIG. 6.

$$\theta d(CA) = \int \{Ne(CA) - Nd(CA)\} dt \qquad (2)$$

$$Nden(CA) = (K/J) \cdot \int \theta d(CA) dt \qquad (3)$$

Figure 7:
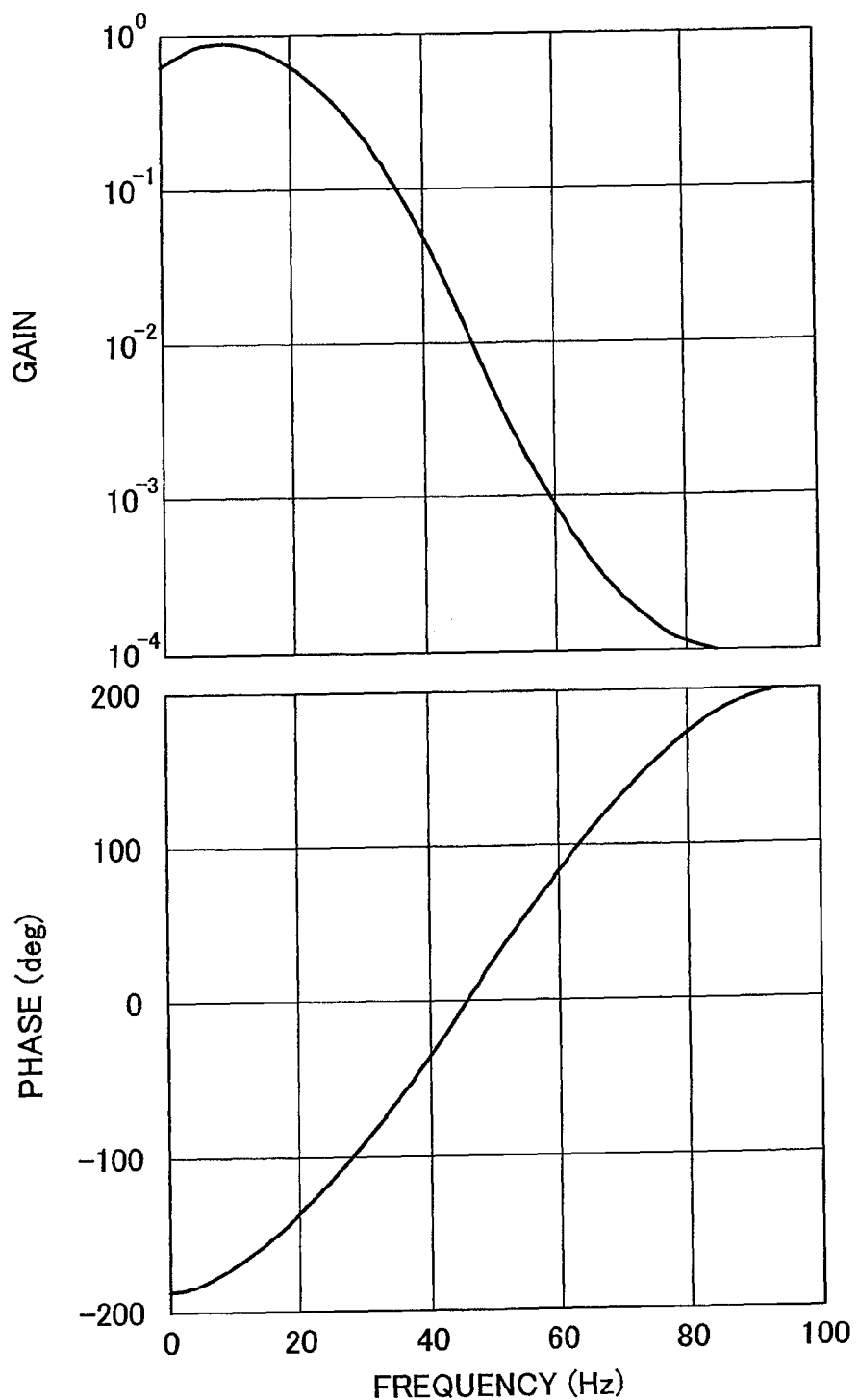
FIG. 7 is an explanatory diagram showing an example of characteristics of a bandpass filter.
Figure 8:
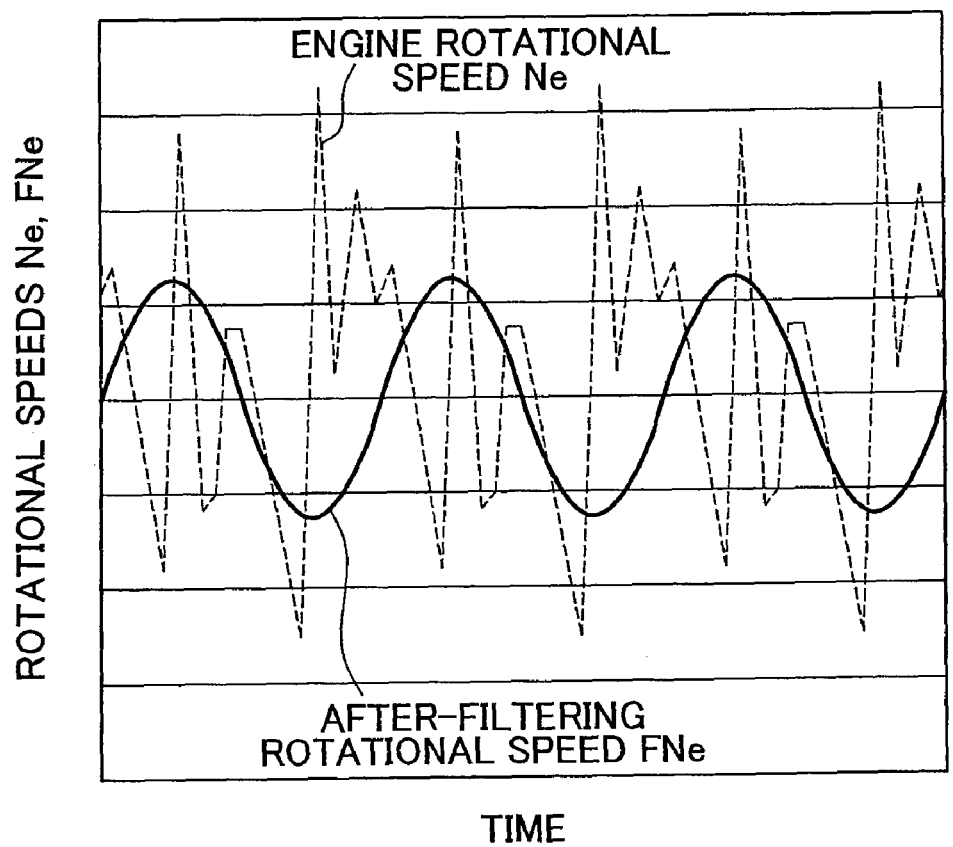
FIG. 8 is an explanatory diagram showing an example of a relation between rotational speed of the engine and after-filtering rotational speed.

In the spring constant estimation process shown in FIG. 6, the CPU 24a of the engine ECU 24 acquires the rotational speed Nd of the engine 22 and the downstream-of-damper rotational speed Nd (step S400), determines whether the engine 22 is in steady operation (step S410), and determines whether the acquired rotational speed Ne of the engine 22 is within a predetermined rotational speed range determined by an upper limit value NH and a lower limit value NL (step S420). Determination as to whether the engine 22 is in steady operation can be made by determining that the engine 22 is in steady operation, provided that variation in the rotational speed Ne of the engine 22 and the load is small for a predetermined period of time (a few seconds, for example). The upper limit value NH and the lower limit value NL, which are used in determining whether the rotational speed Ne of the engine 22 is within the predetermined rotational speed range, are set as the upper limit value and the lower limit value of the rotational speed range in which the resonance due to torsion of the damper 28 is caused. For example, the lower limit value NL is set to 1000 rpm or 1500 rpm, and the upper limit value NH is set to 2000 rpm or 2500 rpm. When it is determined that the engine 22 is not in steady operation (NO in step S410), or it is determined that the rotational speed Ne of the engine 22 is not within the range determined by the upper limit value NH and the lower limit value NL (No in step S420), it is determined that the situation is not suitable to estimate the spring constant K. In this case, the spring constant K that is estimated in the preceding cycle of the spring constant estimation process is used as the spring constant K (step S430), and the process is exited. On the other hand, when it is determined that the engine 22 is in steady operation (YES in step S410), and that the rotational speed Ne of the engine 22 is within the range determined by the upper limit value NH and the lower limit value NL (YES in step S420), a rotational speed FNe after filtering is calculated by passing the acquired rotational speed Ne of the engine 22 through a band-pass filter, and a rotational speed FNd after filtering is calculated by passing the acquired downstream-of-damper rotational speed Nd through the same band-pass filter (step S440). The band-pass filter extracts, from the rotational speed Ne of the engine 22 and the downstream-of-damper rotational speed Nd, the frequency components caused by the resonance due to torsion of the damper 28. FIG. 7 shows an example of the band-pass filter. Assuming that the resonance due to torsion of the damper 28 occurs in the cycle in which misfires occur, that is, the cycle in which the crankshaft 26 rotates twice (half of the rotational cycle), when the rotational speed Ne of the engine 22 is 1000 rpm, a filter that does not attenuate 8 Hz, which is the resonance frequency, and significantly attenuates (to one tenth or below, for example) the other bands may be used as the band-pass filter. In this way, it is possible to make the signals indicating the after-filtering rotational speeds FNe, FNd have smooth sinusoidal waveforms with low noise. FIG. 8 shows an example of the rotational speed Ne of the engine 22 and the after-filtering rotational speed FNe.

Figure 9:
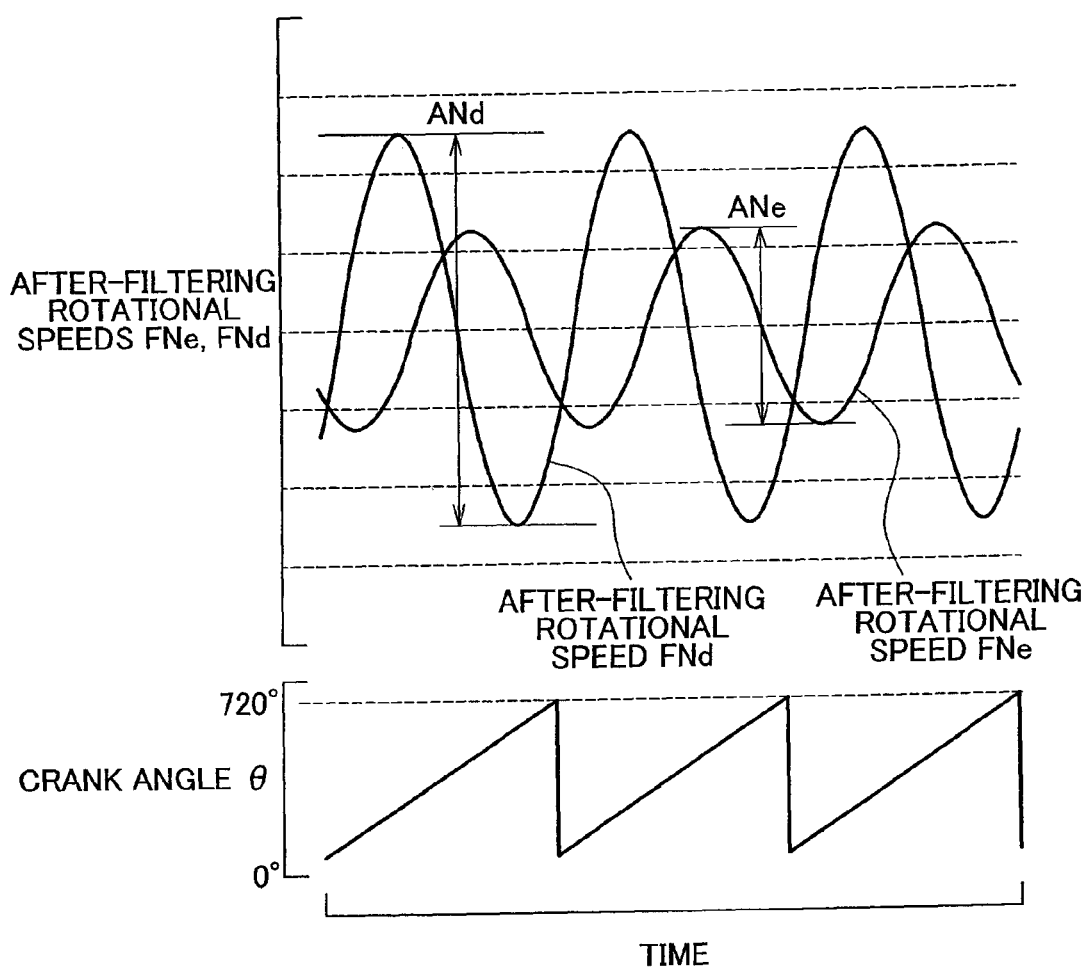
FIG. 9 is an explanatory diagram showing a relation between amplitudes of after-filtering rotational speeds.
Figure 10:
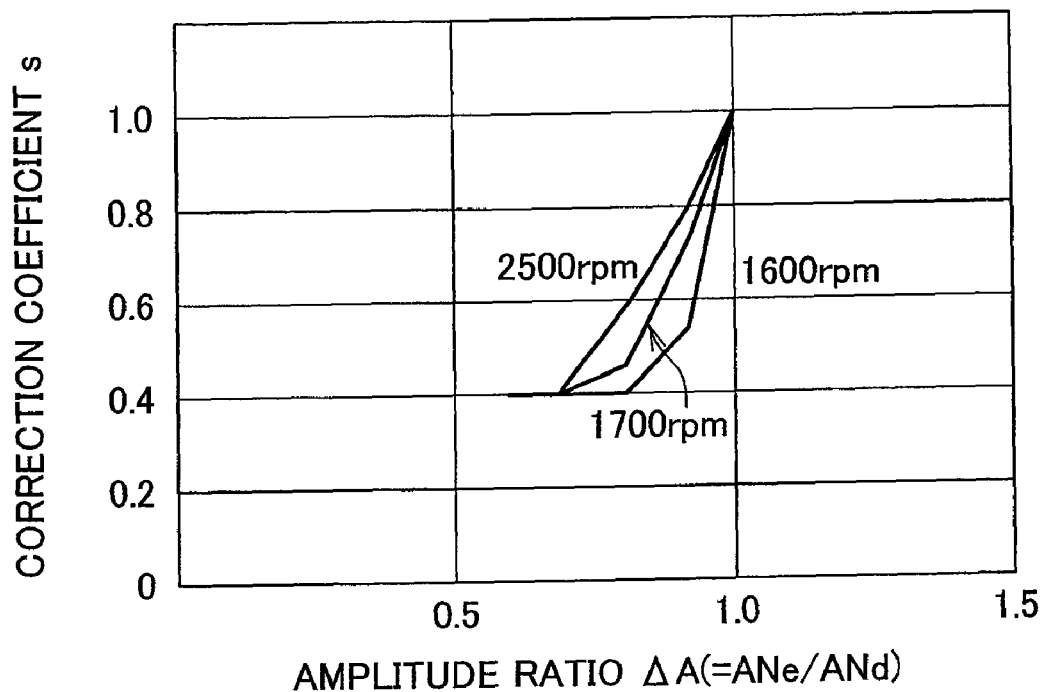
FIG. 10 is an explanatory diagram showing an example of a map for setting a correction coefficient.

After the after-filtering rotational speeds FNe, FNd are calculated, an amplitude ratio ΔA(=ANe/ANd) that is the ratio of an amplitude ANe of the after-filtering rotational speed FNe to an amplitude ANd of the after-filtering rotational speed FNd is calculated (step S450). A correction coefficient "s" is then set based on the calculated amplitude ratio ΔA and the rotational speed Ne of the engine 22 (step S460), the value obtained by multiplying a nominal value Kn of the spring constant by the set correction value "s" is set as the spring constant K (step S470), and the process is exited. An example of the relation between the amplitude ANe of the after-filtering rotational speed FNe and the amplitude ANd of the after-filtering rotational speed FNd is shown in FIG. 9. Because the crankshaft 26 of the engine 22 is connected to the carrier shaft 34a through the damper 28, the fluctuation in torque of the crankshaft 26 induces the resonance due to torsion of the damper 28, and the resonance in turn brings about fluctuation in rotation of the carrier shaft 34a and the crankshaft 26. Thus, by detecting the ratio between the amplitude of the rotational speed Ne of the engine 22 and the amplitude of the downstream-of-damper rotational speed Nd, it is possible to estimate the gain characteristics of the damper 28, that is, the spring constant K. In this embodiment, the rotational speed Ne of the engine 22 and the downstream-of-damper rotational speed Nd contain much noise, and it is therefore not easy to detect the actual amplitude ratio of the rotational speeds Ne, Nd. Thus, the spring constant K is estimated by detecting the amplitude ratio ΔA of the after-filtering rotational speeds FNe, FNd after converting the rotational speed Ne of the engine 22 and the downstream-of-damper rotational speed Nd into the after-filtering rotational speeds FNe, FNd having smooth sinusoidal waveforms with low noise with the use of the band-pass filter that extracts the frequency components caused by the resonance due to torsion of the damper 28. In this embodiment, the relation between the amplitude ratio ΔA of the after-filtering rotational speeds FNe, FNd, the rotational speed Ne of the engine 22, and the correction coefficient s is determined and stored as a map in the ROM 74 in advance, and the correction coefficient s is set by, when the amplitude ratio ΔA and the rotational speed Ne of the engine 22 are given, deriving the corresponding correction coefficient s from the map. FIG. 10 shows an example of the map. As shown in FIG. 10, the correction coefficient s is set such that the lower the amplitude ratio ΔA is, the lower the spring constant K is. In this way, even when a manufacturing error and/or a chronological change occurs in the damper 28, it is possible to calculate the noise-containing resonance influence component Nden(CA) with the use of a proper spring constant K.

As described above, in the spring constant estimation process shown in FIG. 6, the spring constant K is estimated using the amplitude ratio ΔA of the after-filtering rotational speeds FNe, FNd that are obtained by extracting the frequency components caused by the resonance due to torsion of the damper 28 from the rotational speed Ne of the engine 22 and the downstream-of-damper rotational speed Nd. Because resonance occurs in the cycle in which the engine 22 misfires, the spring constant estimation process may be such that it is performed only when the determining value J30 is close to the threshold value Jref and therefore there is a possibility that the engine 22 is misfiring.

Returning again to FIG. 4, after the noise-containing resonance influence component Nden is calculated in this way, in order to eliminate low-frequency noise in the noise-containing resonance influence component Nden(CA), the noise-containing resonance influence component Nden(CA) is passed through a high-pass filter to calculate a resonance influence component Nde(CA) (step S230), and the rotational speed Nj(CA) for determination is calculated by subtracting the calculated resonance influence component Nde(CA) from the rotational speed Ne(CA) of the engine 22 (step S240). With regard to the high-pass filter, it suffices that the cut-off frequency is set so that the resonance frequency of the damper 28 is not attenuated, while the band of frequencies lower than the resonance frequency is attenuated. When such a high-pass filter is used, it is possible to eliminate the low-frequency components accumulated due to the integrations according to the above-described equations (2) and (3).

The rotational speed Nj(CA) for determination that is calculated in the rotational-speed-for-determination calculation process is obtained by subtracting the resonance influence component Nde(CA), which is the component caused by the influence of resonance due to torsion of the damper 28 from the rotational speed detected by the crank position sensor 140 and calculated, that is, the rotational speed Ne of the engine 22 that is the rotational speed subjected to the influence of the resonance due to torsion of the damper 28. Thus, the rotational speed Nj(CA) for determination reflects only the rotational fluctuation caused by the explosion (combustion) and the misfire in each cylinder of the engine 22. Thus, when the misfire determination in the engine 22 is performed using the rotational speed Nj(CA) for determination, it is possible to accurately determine the occurrence of a misfire in the engine 22 even when the resonance due to torsion of the damper 28 is occurring.

According to the misfire determination system for an internal combustion engine that is mounted on the hybrid car 20 of the above-described embodiment, the after-filtering rotational speeds FNe, FNd are calculated by passing the rotational speed Ne of the engine 22 and the downstream-of-damper rotational speed Nd on the downstream side of the damper 28 through a band-pass filter that extracts, from the rotational speed Ne of the engine 22 and the downstream-of-damper rotational speed Nd, the frequency components caused by the resonance due to torsion of the damper 28, and the spring constant K of the damper 28 is estimated based on the amplitude ratio ΔA of the calculated after-filtering rotational speeds FNe, FNd and on the rotational speed Ne of the engine 22. Then, the resonance influence component Nde (CA) is calculated using the rotational speed Ne(CA) of the engine 22, the downstream-of-damper rotational speed Nd(CA), the constant ratio (K/J) that is the ratio between the spring constant K of the damper 28 and the moment of inertia J on the engine 22 side of the damper 28. Then, the rotational speed Nj(CA) for determination is calculated by subtracting the resonance influence component Nde(CA) from the rotational speed Ne(CA) of the engine 22, and the occurrence of a misfire in the engine 22 is determined based on the rotational speed Nj(CA) for determination. Thus, even when a manufacturing error and/or a chronological change occurs in the damper 28, it is possible to accurately estimate the spring constant K, and it is possible to calculate the resonance influence component Nde(CA) based on the spring constant K that is estimated in this way. In addition, it is possible to more accurately determine the occurrence of a misfire in the engine 22 even when there is a resonance due to torsion of the damper 28 by determining the occurrence of a misfire in the engine 22 based on the rotational speed Nj(CA) for determination obtained by subtracting the resonance influence component Nde(CA) from the rotational speed Ne(CA) of the engine 22.

Although, in the misfire determination process performed in the misfire determination system for the internal combustion engine mounted on the hybrid car 20 of the above-described embodiment, it is not assumed that vibration control for controlling the vibration due to the fluctuation in torque of the ring gear shaft 32a connected to the axle shaft side is performed using the motors MG1, MG2, it is possible to determine the occurrence of a misfire in the engine 22 with the use of the above-described misfire determination process even when the vibration control is performed using the motors MG1, MG2.

In the misfire determination system for an internal combustion engine mounted on the hybrid car 20 of the embodiment, the spring constant K is not estimated when the engine 22 is not in steady operation. However, although the accuracy is slightly reduced, the misfire determination system may be configured such that the spring constant K is estimated even when the engine 22 is not in steady operation.

Although, in the misfire determination system for an internal combustion engine mounted on the hybrid car 20 of the embodiment, the spring constant K is estimated using the amplitude ratio ΔA(=ANe/ANd) that is the ratio of the amplitude ANe of the after-filtering rotational speed FNe to the amplitude ANd of the after-filtering rotational speed FNd, the spring constant K may be estimated using the difference (=ANd−ANe) between the amplitude ANd of the after-filtering rotational speed FNd and the amplitude ANe of the after-filtering rotational speed FNe.

In the misfire determination system for an internal combustion engine mounted on the hybrid car 20 of the embodiment, the torsion angle θd (CA) of the damper 28 is calculated based on the rotational speed Ne(CA) of the engine 22 and the downstream-of-damper rotational speed Nd(CA) on the downstream side of the damper 28, the noise-containing resonance influence component Nden(CA) is calculated based on the spring constant K of the damper 28, the constant ratio (K/J), and the torsion angle θd(CA), the calculated noise-containing resonance influence component Nden(CA) is passed through a high-pass filter to calculate the resonance influence component Nde(CA), the rotational speed Nj(CA) for determination is calculated by subtracting the resonance influence component Nde(CA) from the rotational speed Ne(CA) of the engine 22, and the occurrence of a misfire in the engine 22 is determined based on the rotational speed Nj(CA) for determination. However, any calculation method may be used as long as the resonance influence component Nde(CA) is calculated using the rotational speed Ne(CA) of the engine 22 and the downstream-of-damper rotational speed Nd(CA) on the downstream side of the damper 28. The resonance influence component Nde(CA) does not have to be calculated by passing the noise-containing resonance influence component Nden(CA) through a high-pass filter.

Although, in the misfire determination system for an internal combustion engine mounted on the hybrid car 20 of the embodiment, the downstream-of-damper rotational speed Nd is calculated based on the rotational speeds Nm1, Nm2 of the motors MG1, MG2, a rotational speed sensor may be provided for the carrier shaft 34a to directly detect the rotational speed of the carrier shaft 34a, and the detected rotational speed may be used as the downstream-of-damper rotational speed Nd.

Figure 11:
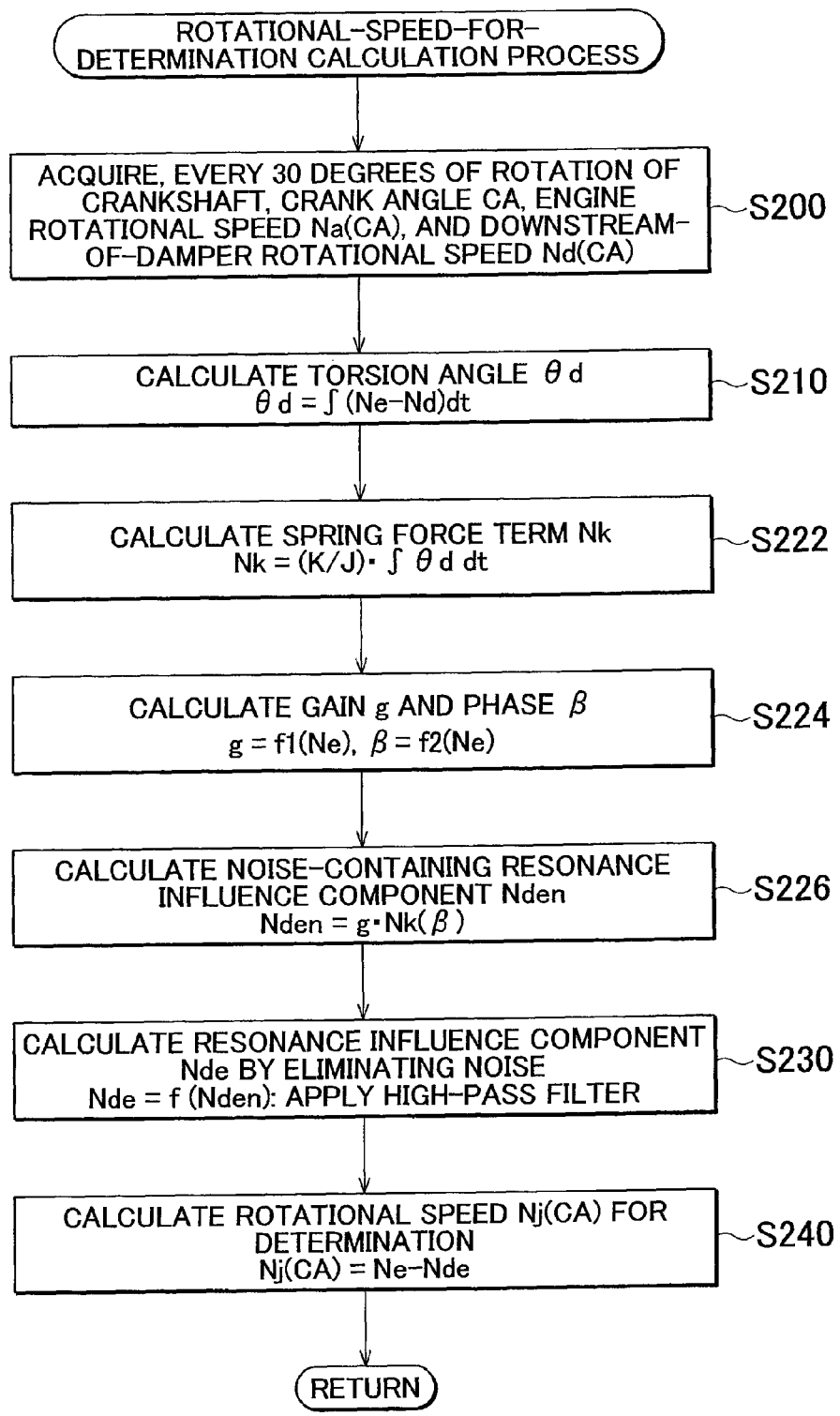
FIG. 11 is a flow chart showing an example of a rotational-speed-for-determination calculation process.

In the misfire determination system for an internal combustion engine mounted on the hybrid car 20 of the embodiment, in the process of calculating the rotational speed Nj(CA) for determination, the noise-containing resonance influence component Nden(CA) is calculated according to the above equation (3) using the torsion angle θd(CA) of the damper 28 that is calculated with the use of the rotational speed Ne(CA) of the engine 22 and the downstream-of-damper rotational speed Nd(CA), and using the constant ratio (K/J) that is the ratio between the spring constant K of the damper 28 and the moment of inertia J on the engine 22 side of the damper 28. However, the component obtained by reflecting, in the spring force term of the damper 28 calculated according to the equation (3), a gain g and a phase β, which are influences of the damping force term of the damper 28 on the spring force term thereof may be calculated as the noise-containing resonance influence component Nden(CA). A flow chart of the rotational-speed-for-determination calculation process in this case is shown in FIG. 11. In this rotational-speed-for-determination calculation process, after the torsion angle θd(CA) of the damper 28 is calculated, the spring force term Nk is calculated that is calculated on the assumption that the left hand side of the equation (3) is the spring force term Nk of the damper 28 (step S222), the gain g and the phase β that are influences of the damping force term of the damper 28 on the spring force term Nk according to the following equations (4) and (5) based on the rotational speed Ne(CA) of the engine 22 (step S224), and the noise-containing resonance influence component Nden(CA) is calculated with the calculated gain g and phase β reflected in the spring force term Nk (step S226). In order to eliminate low-frequency noise in the noise-containing resonance influence component Nden(CA), the noise-containing resonance influence component Nden(CA) is passed through a high-pass filter to calculate a resonance influence component Nde(CA) (step S230), and the rotational speed Nj(CA) for determination is calculated by subtracting the calculated resonance influence component Nde(CA) from the rotational speed Ne(CA) of the engine 22 (step S240). Next, the gain g and the phase β will be described that are influences of the damping force term of the damper 28 on the spring force term Nk.

$$g = \sqrt{1 + (2\pi f)^2 \cdot \left(\frac{Cdamp}{Kdamp}\right)^2} \quad (4)$$

$$\beta = \tan^{-1} \frac{(2\pi f) \cdot Cdamp}{Kdamp} \quad (5)$$

Assume that the rotational angular velocity of the damper 28 that is a component that exerts an influence on the crankshaft 26 is ωe-damp, the rotational angular velocity of the crankshaft 26 is ωe, the rotational angular velocity of the shaft on the downstream side of the damper 28 is ωinp, the rotational angle of the crankshaft 26 is θe, the rotational angle of the shaft downstream of the damper 28 is θinp, the spring constant of the damper 28 is Kdamp, the constant of the damping force term of the damper 28 is Cdamp, and the moment of inertia on the engine 22 side of the damper 28 is Ie. Then, the component ωe-damp that is an influence of the damper 28 on the crankshaft 26 can be expressed by the equation (6), which can be transformed into the equation (7). The first term on the right hand side of the equation (6) is the spring force term, and the second term on the right hand side thereof is the damping force term.

$$\omega e\text{-damp} = \frac{kdamp}{Ie} \int (\theta inp - \theta e) dt + \frac{Cdamp}{Ie} \int (\omega inp - \omega e) dt \quad (6)$$

-continued $$\omega e\text{-damp} = \frac{Kdamp}{Ie} \int\int (\omega inp - \omega e) dt^2 + \frac{Cdamp}{Ie} \int (\omega inp - \omega e) dt \quad (7)$$

When it is assumed that the frequency of misfires when there is a misfire in one of the cylinders of the engine 22 is f, the amplitude of the torsional angular velocity of the damper 28 is α, and the torsional angular velocity of the damper 28 is expressed by the equation (8), the equation (7) can be transformed into the equation (9). By comparing the first term, which is the spring force term, on the right hand side of the second line of the equation (9) with the third line thereof, the above equations (4) and (5) can be obtained.

$$(\omega inp - \omega e) = \alpha \cdot \sin(2\pi f) \quad (8)$$

$$\omega e\text{-damp} = \frac{Kdamp}{Ie} \int\int (\alpha \cdot \sin(2\pi f)) dt^2 + \quad (9)$$
$$\frac{Cdamp}{Ie} \int (\alpha \cdot \sin(2\pi f)) dt$$
$$= \frac{Kdamp}{Ie} \cdot \frac{-\alpha \cdot \sin(2\pi f)}{(2\pi f)^2} +$$
$$\frac{Cdamp}{Ie} \cdot \frac{-\alpha \cos(2\pi f)}{(2\pi f)}$$
$$= \frac{-\alpha}{Ie \cdot (2\pi f)^2} \sqrt{Kdamp^2 + (2\pi f)^2 \cdot Cdamp^2} \cdot$$
$$\sin(2\pi f + \beta)$$

where $\tan\beta = \frac{(2\pi f) \cdot Cdamp}{Kdamp}$

When it is assumed that misfires consecutively occur in one of the cylinders of the engine 22, a misfire occurs per two rotations of the crankshaft 26, and the frequency f of misfires can be calculated as f=Ne/120 using the rotational speed Ne of the engine 22. Thus, the gain g and the phase β that are influences of the damping force term of the damper 28 on the spring force term Nk can be calculated by substituting, into the equations (4) and (5), the values of the frequency f of misfires that is calculated using the rotational speed Ne of the engine 22, the spring constant Kdamp obtained by multiplying the constant ratio (K/J) by the moment of inertia J empirically obtained in advance, for example, and the constant Cdamp empirically obtained in advance, for example. Needless to say, the rotational speed Ne of the engine 22 and the downstream-of-damper rotational speed Nd can be replaced by the rotational angular velocity ωe of the crankshaft 26 and the rotational angular velocity ωinp of the shaft downstream of the damper 28 by multiplying the rotational speed Ne(CA) of the engine 22 and the downstream-of-damper rotational speed Nd by a conversion constant, such as 2π/60.

By calculating the gain g and the phase β that are influences of the damping force term of the damper 28 on the spring force term Nk, and calculating the noise-containing resonance influence component Nden(CA) with the calculated gain g and phase β reflected in the spring force term Nk, it is possible to more properly calculate the noise-containing resonance influence component Nden(CA), and it is possible to more properly calculate the rotational speed Nj(CA) for determination. As a result, it is possible to more accurately determine the occurrence of a misfire in the engine 22.

The misfire determination system for an internal combustion engine mounted on the hybrid car 20 of the embodiment acquires, every 30 degrees of rotation of the crankshaft, the crank angle CA, the rotational speed Ne(CA) of the engine 22, and the rotational speeds Nm1(CA), Nm2(CA) of the motors MG1, MG2, calculates the downstream-of-damper rotational speed Nd(CA) and the resonance influence component Nde(CA), and calculates the rotational speed Nj(CA) for determination. However, the crank angle at which the rotational speed Nj(CA) for determination is calculated is not limited, and therefore, the resonance influence component Nden(CA) and the rotational speed Nj(CA) for determination may be calculated every 10 degrees or 5 degrees of rotation of the crankshaft.

In the misfire determination system for an internal combustion engine mounted on the hybrid car 20 of the embodiment, the occurrence of a misfire in the engine 22 is determined by determining the 30-degree rotation time T30(CA) from the rotational speed Nj(CA) for determination, calculating the time difference TD30, which is the difference between the 30-degree rotation time T30(ATDC30) at the point 30 degrees after the top dead center of a compression stroke of the cylinder that is the subject of the misfire determination (ATDC30) and T30(ATDC90) at the point 90 degrees after the same top dead center (ATDC90), and calculating the determining value J30, which is the difference in the time differences TD30, the latter of which is calculated 360 degrees after the point at which the former is calculated. However, any calculation method may be used to determine the occurrence of a misfire in the engine 22 as long as the occurrence of a misfire in the engine 22 is determined using the rotational speed Nj(CA) for determination.

Although, in the misfire determination system for an internal combustion engine mounted on the hybrid car 20 of the embodiment, the occurrence of a misfire in one of the cylinders of the 8-cylinder engine 22 is determined, the number of cylinders is not limited as long as the system determines the occurrence of a misfire in one of the cylinders of a multi-cylinder engine, that is, for example, the system determines the occurrence of a misfire in one of the cylinders of a 6-cylinder engine, or the occurrence of a misfire in one of the cylinders of a 4-cylinder engine.

Although, in the misfire determination system for an internal combustion engine mounted on the hybrid car 20 of the embodiment, the occurrence of a misfire in the engine 22 in a system in which the motor MG2 is connected to the ring gear shaft 32a through the speed reduction gear 35 is determined, the occurrence of a misfire in the engine 22 in a system in which the motor MG2 is connected to the ring gear shaft 32a through a transmission instead of the speed reduction gear 35 may be determined. Alternatively, the engine 22, in which the occurrence of a misfire is determined, may have a configuration in which the motor MG2 is directly connected to the ring gear shaft 32a without the speed reduction gear 35 or the transmission interposed therebetween.

Figure 12:
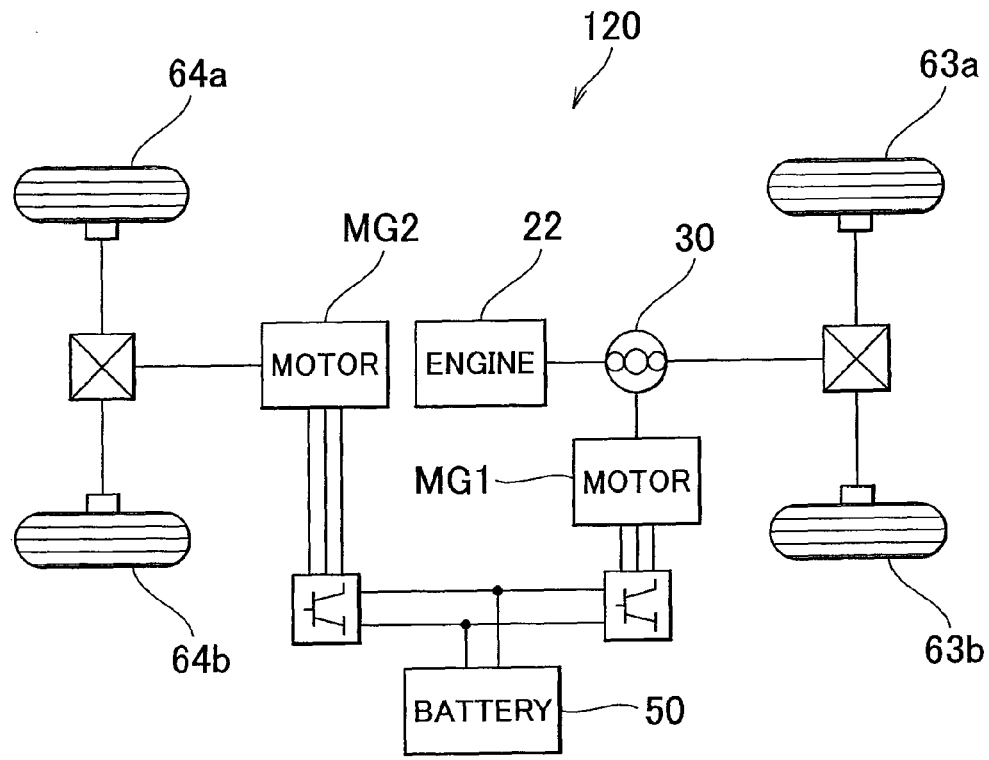
FIG. 12 is a configuration diagram showing an outline of a configuration of a hybrid car of a modification.
Figure 13:
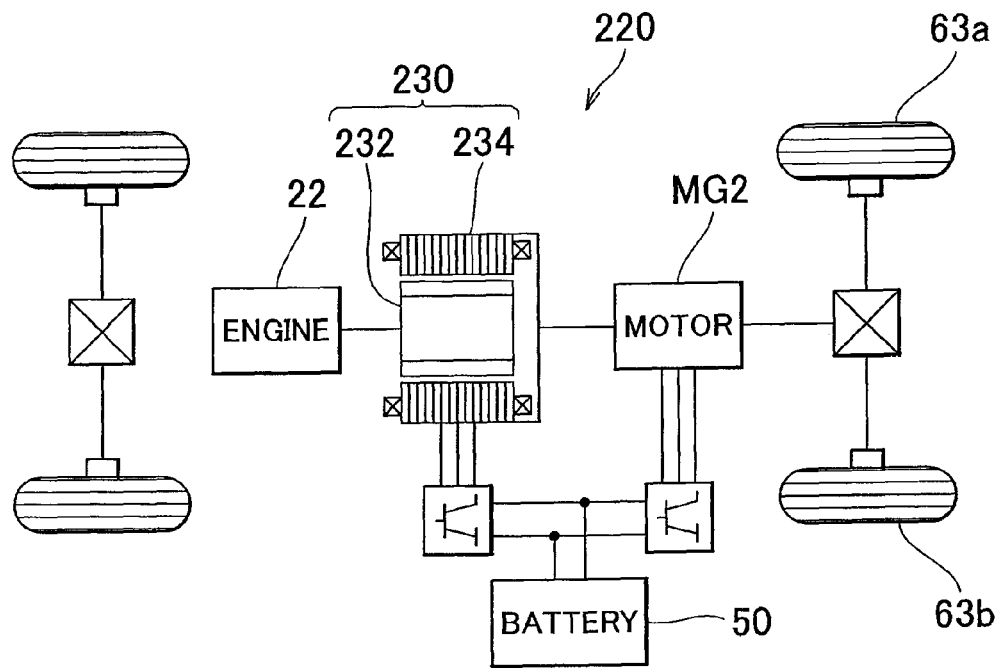
FIG. 13 is a configuration diagram showing an outline of a configuration of a hybrid car of a modification.

The misfire determination system for an internal combustion engine mounted on the hybrid car 20 of the embodiment determines the occurrence of a misfire in the engine 22 of the vehicle provided with the power distribution/integration mechanism 30 and the motor MG2, the power distribution/integration mechanism 30 connected to the crankshaft 26 of the engine 22 through the damper 28, which serves as a torsion element, and connected to the ring gear shaft 32a and the rotary shaft of the motor MG1, the motor MG2 connected to the ring gear shaft 32a through the speed reduction gear 35. However, the invention is applicable when the crankshaft of the engine is connected to the downstream side through the damper, which serves as a torsion element, and therefore, the engine 22, in which the occurrence of a misfire is determined, may have a configuration in which the mechanical power from the motor MG2 is transmitted to the axle (the axle connected to wheels 64a, 64b in FIG. 12) different from the axle (the axle connected to the wheels 63a, 63b) to which the ring gear shaft 32a is connected, as illustrated by a hybrid car 120 of a modification shown in FIG. 12. Alternatively, as illustrated by a hybrid car 220 of a modification shown in FIG. 13, the engine 22, in which the occurrence of a misfire is determined, may be provided with a double-rotor generator 230 that has an inner rotor 232 connected to the crankshaft 26 of the engine 22 through the damper 28 and an outer rotor 234 connected to the axle side on which the mechanical power is output to the driving wheels 63a, 63b, and that transmits part of the mechanical power from the engine 22 to the axle side and converts the remaining mechanical power into electric power. In this case, the motor MG2 may be either connected to the axle side through the speed reduction gear 35 or the transmission, or connected to the axle side without the speed reduction gear 35 or the transmission interposed therebetween.

Relations between the main components of the embodiments and the main elements of the inventions described in the "SUMMARY OF THE INVENTION" section will now be described. In the embodiment, the crank position sensor 140 that detects the rotational position of the crankshaft 26 and the engine ECU 24 that calculates, as the rotational speed Ne of the engine 22, the rotational speed during each 30-degree rotation of the crankshaft 26 based on the shaped waves received from the crank position sensor 140 are an example of the "output-shaft rotational-speed detection section". The rotational position detection sensors 43, 44 that detect the rotational positions of the rotors of the motors MG1, MG2, the motor ECU 40 that calculates the rotational speeds Nm1, Nm2 of the motors MG1, MG2 based on the signals from the rotational position detection sensors 43, 44, and the hybrid ECU 70 that calculates the downstream-of-damper rotational speed Nd, which is the rotational speed of the carrier shaft 34a (an example of the downstream shaft) downstream of the damper 28 based on the rotational speeds Nm1, Nm2 of the motors MG1, MG2 are an example of the "downstream shaft rotational-speed detection section". An example of the "rigidity estimation section" is the engine ECU 24 that performs the spring constant estimation process shown in FIG. 6 in which the after-filtering rotational speeds FNe, FNd obtained by extracting the frequency components caused by the resonance due to torsion of the damper 28 from the rotational speed Ne of the engine 22 and the downstream-of-damper rotational speed Nd with the use of the bandpass filter are calculated, and the spring constant K of the damper 28 is estimated based on the amplitude ratio ΔA of the calculated after-filtering rotational speeds FNe, FNd and the rotational speed Ne of the engine 22. An example of the "resonance-influence component calculation section" is the engine ECU 24 that performs the steps of S200 to S230 shown in FIG. 4 in which: the engine ECU 24 calculates the torsion angle θb of the damper 28 according to the equation (2) using the rotational speed Ne of the engine 22 and the downstream-of-damper rotational speed Nd; the engine ECU 24 calculates the noise-containing resonance influence component Nden (CA) containing low-frequency noise as the influence of resonance of the damper 28 on the rotational speed of the engine 22 using a constant ratio (K/J) that is the ratio between the spring constant K of the damper 28 and a moment of inertia J on the engine 22 side of the damper 28 and the torsion angle θd; and the engine ECU 24 calculates the resonance influence component Nde(CA) by eliminating low-frequency noise with the use of a high-pass filter. An example of the "misfire determination section" is the engine ECU 24 that performs the process of S240 shown in FIG. 4, in which the rotational speed Nj(CA) for determination is calculated by subtracting the resonance influence component Nde(CA) from the rotational speed Ne(CA) of the engine 22, and that also performs the misfire determination process shown in FIG. 3 in which the occurrence of a misfire in the engine 22 is determined using the rotational speed Nj(CA) for determination. The motor MG2 that outputs power to the carrier shaft 34a side downstream of the damper 28, that is, the downstream ring gear shaft 32a, through the speed reduction gear 35 is an example of the "electric motor". The power distribution/integration mechanism 30 connected to the carrier shaft 34a downstream of the damper 28 and to the axle-side ring gear shaft 32a and the motor MG1 connected to the sun gear 31 of the power distribution/integration mechanism 30 are an example of the "electric power/mechanical power input/output device". The relations between the main components of the embodiment and the main elements of the inventions described in the "SUMMARY OF THE INVENTION" section do not limit the elements of the inventions described in the "SUMMARY OF THE INVENTION" section because the embodiments are merely an example for specifically describing a mode for carrying out the inventions described in the "SUMMARY OF THE INVENTION" section.

Although the embodiment has been described as the misfire determination system for an internal combustion engine mounted on the hybrid car 20, the invention may be applied to the misfire determination system for an internal combustion engine mounted on a car that includes neither a vehicle-driving electric motor nor an electric generator. The invention may be applied to the misfire determination system for an internal combustion engine mounted on a vehicle other than cars, or a mobile object, such as a boat, a ship, or an aircraft, and may also be applied to the misfire determination system for an internal combustion engine installed in a fixed facility. Instead of the form of the misfire determination system for an internal combustion engine or the vehicle in which the system is installed, the invention may be implemented in the form of a misfire determination method for an internal combustion engine, in the form of a system for estimating the rigidity of a torsion element, which corresponds to the damper 28, or in the form of a method of estimating the rigidity of a torsion element. When the invention is implemented in the form of a system for estimating the rigidity of a torsion element or in the form of a method of estimating the rigidity of a torsion element, instead of applying the invention to a misfire determination system for an internal combustion engine or to a misfire determination method for an internal combustion engine, the invention can be used, for example, to identify the cylinder in which combustion is weak. This is because, when the engine 22 is idling and there is unevenness in combustion between the cylinder in which combustion is strong and the cylinder in which combustion is weak, the cycle of the unevenness is the same as the misfiring cycle (the cycle in which the crankshaft 26 rotates twice).

While best modes for carrying out the invention have been described using the embodiments, the invention is not limited to such an embodiment at all, and the invention can be implemented in various forms without departing from the spirit and scope of the invention.

What is claimed is:

1. An internal-combustion-engine misfire determination system for determining an occurrence of a misfire in a multi-cylinder internal combustion engine, of which an output shaft is connected, through a torsion element, to a downstream shaft downstream of the torsion element, the misfire determination system comprising:

an output shaft rotational speed detection section that detects an output shaft rotational speed that is the rotational speed of the output shaft;
a downstream shaft rotational speed detection section that detects a downstream shaft rotational speed that is the rotational speed of the downstream shaft;
a rigidity estimation section that estimates a rigidity of the torsion element based on the output shaft rotational speed and the downstream shaft rotational speed; and
a misfire determination section that determines the occurrence of the misfire in the internal combustion engine based on the detected output shaft rotational speed and the estimated rigidity of the torsion element.

2. The internal-combustion-engine misfire determination system according to claim 1, wherein the rigidity estimation section performs a rigidity estimation process in which a frequency component caused by a resonance due to torsion of the torsion element is extracted from the detected output shaft rotational speed, a frequency component caused by the resonance is extracted from the detected downstream shaft rotational speed, and the rigidity of the torsion element is estimated based on a value obtained by comparing amplitudes of both of the extracted frequency components and on the detected output shaft rotational speed.

3. The internal-combustion-engine misfire determination system according to claim 2, further comprising a resonance influence component calculation section that calculates a resonance influence component caused by an influence of the resonance on the output shaft rotational speed based on the estimated rigidity of the torsion element, the detected output shaft rotational speed, and the detected downstream shaft rotational speed,
wherein the misfire determination section determines the occurrence of the misfire in the internal combustion engine based on a rotational speed for determination that is obtained by subtracting the calculated resonance influence component from the detected output shaft rotational speed.

4. The internal-combustion-engine misfire determination system according to claim 3, wherein the rigidity estimation section extracts, as the frequency components caused by the resonance, a frequency component whose frequency is once per two rotations of the output shaft of the internal combustion engine.

5. The internal-combustion-engine misfire determination system according to claim 3, wherein the rigidity estimation section extracts each of the frequency components, caused by the resonance, by performing a filtering process that does not attenuate a frequency of the resonance but attenuates bands other than the resonance frequency.

6. The internal-combustion-engine misfire determination system according to claim 5, wherein the filtering process is a process using a bandpass filter.

7. The internal-combustion-engine misfire determination system according to claim 3, wherein the rigidity estimation section performs the rigidity estimation process when the detected output shaft rotational speed is within a predetermined rotational speed range in which the resonance due to torsion of the torsion element is caused.

8. The internal-combustion-engine misfire determination system according to claim 3, wherein the rigidity estimation section performs the rigidity estimation process while the internal combustion engine is in steady operation.

9. The internal-combustion-engine misfire determination system according to claim 8, wherein it is determined that the engine is in steady operation when at least one of following conditions is met that the output shaft rotational speed is equal to or lower than a predetermined value and that a fluctuation in a load of the internal combustion engine that is estimated from an amount of air taken into the internal combustion engine is equal to or less than a given value.

10. The internal-combustion-engine misfire determination system according to claim 3, wherein the rigidity estimation section estimates the rigidity of the torsion element based on a ratio of the frequency component, caused by the resonance, of the downstream shaft rotational speed to the frequency component, caused by the resonance, of the output shaft rotational speed, and on the detected output shaft rotational speed.

11. The internal-combustion-engine misfire determination system according to claim 10, wherein the frequency component, caused by the resonance, of the downstream shaft rotational speed and the frequency component, caused by the resonance, of the output shaft rotational speed are obtained by subjecting the downstream shaft rotational speed and the output shaft rotational speed to a process using a bandpass filter that attenuates bands other than a frequency of the resonance.

12. The internal-combustion-engine misfire determination system according to claim 3, wherein the rigidity estimation section estimates the rigidity of the torsion element based a difference between the frequency component, caused by the resonance, of the downstream shaft rotational speed and the frequency component, caused by the resonance, of the output shaft rotational speed, and on the detected output shaft rotational speed.

13. The internal-combustion-engine misfire determination system according to claim 3, wherein the resonance influence component calculation section calculates the resonance influence component caused by the influence of the resonance on the output shaft rotational speed by performing a filtering process in which a frequency is not attenuated at which the resonance affects the output shaft rotational speed, and in which a frequency is attenuated at which the resonance does not affect the output shaft rotational speed.

14. The internal-combustion-engine misfire determination system according to claim 13, wherein the filtering process is a process using a high-pass filter.

15. The internal-combustion-engine misfire determination system according to claim 3, wherein the resonance influence component calculation section calculates a torsion angle of the torsion element based on the detected output shaft rotational speed and the detected downstream shaft rotational speed, and calculates the resonance influence component based on the calculated torsion angle, a spring constant, which represents the estimated rigidity of the torsion element, and a moment of inertia on the internal combustion engine side of the torsion element.

16. The internal-combustion-engine misfire determination system according to claim 15, wherein the resonance influence component calculation section calculates the torsion angle by integrating a value obtained by subtracting the detected downstream shaft rotational speed from the detected output shaft rotational speed, and calculates the resonance influence component by integrating a product of the torsion angle and a constant ratio between the spring constant and the moment of inertia.

17. A vehicle comprising:
a multi-cylinder internal combustion engine of which an output shaft is connected, through a torsion element, to a downstream shaft downstream of the torsion element; and
the internal-combustion-engine misfire determination system according to claim 1.

18. A vehicle according to claim 17, further comprising an electric motor that outputs mechanical power to the downstream shaft side downstream of the torsion element,
wherein the downstream shaft rotational speed detection section detects an electric motor rotational speed that is the rotational speed of the electric motor, and detects the downstream shaft rotational speed by converting the detected electric motor rotational speed.

19. The vehicle according to claim 17, further comprising an electric power/mechanical power input/output device that is connected to the downstream shaft and an axle side and that receives and outputs mechanical power from and to the downstream shaft and the axle side, which involves input and output of electric power and mechanical power to and from the electric power/mechanical power input/output device,
wherein the electric motor is connected to the axle side so as to be able to output mechanical power to the axle side,
wherein the downstream shaft rotational speed detection section also detects a drive state in which the electric power/mechanical power input/output device is driven, and
wherein the downstream shaft rotational speed detection section detects the downstream shaft rotational speed by calculation using the detected electric motor rotational speed and the detected drive state.

20. A torsion-element rigidity estimation system for estimating a rigidity of a torsion element that is interposed between an output shaft of a multi-cylinder internal combustion engine and a downstream shaft, the system comprising:
an output-shaft rotational speed detection section that detects an output shaft rotational speed that is the rotational speed of the output shaft;
a downstream shaft rotational speed detection section that detects a downstream shaft rotational speed that is the rotational speed of the downstream shaft;
a rigidity estimation section that extracts a frequency component caused by a resonance due to torsion of the torsion element from the detected output shaft rotational speed, extracts a frequency component caused by the resonance from the detected downstream shaft rotational speed, and estimates the rigidity of the torsion element based on a value obtained by comparing amplitudes of both of the extracted frequency components and on the detected output shaft rotational speed.

21. An internal-combustion-engine misfire determination method of determining an occurrence of a misfire in a multi-cylinder internal combustion engine, of which an output shaft is connected, through a torsion element, to a downstream shaft downstream of the torsion element, the misfire determination method comprising:
extracting a frequency component caused by a resonance due to torsion of the torsion element from an output shaft rotational speed that is the rotational speed of the output shaft, extracting a frequency component caused by the resonance from a downstream shaft rotational speed that is the rotational speed of the downstream shaft, and estimating a rigidity of the torsion element based on a value obtained by comparing amplitudes of both of the extracted frequency components and on the output shaft rotational speed;
calculating a resonance influence component caused by an influence of a resonance on the output shaft rotational speed, based on the estimated rigidity of the torsion element, the output shaft rotational speed and the downstream shaft rotational speed, and
determining the occurrence of the misfire in the internal combustion engine based on a rotational speed for determination that is obtained by subtracting the calculated resonance influence component from the output shaft rotational speed.

22. A torsion-element rigidity estimation method of estimating a rigidity of a torsion element that is interposed between an output shaft of a multi-cylinder internal combustion engine and a downstream shaft, the method comprising:

extracting a frequency component caused by a resonance due to torsion of the torsion element from an output shaft rotational speed that is the rotational speed of the output shaft, and extracting a frequency component caused by the resonance from a downstream shaft rotational speed that is the rotational speed of the downstream shaft; and estimating the rigidity of the torsion element based on a value obtained by comparing amplitudes of both of the extracted frequency components and on the output shaft rotational speed.

\* \* \* \* \*

UNITED STATES PATENT AND TRADEMARK OFFICE
CERTIFICATE OF CORRECTION

PATENT NO. : 7,712,356 B2  
APPLICATION NO. : 12/330682  
DATED : May 11, 2010  
INVENTOR(S) : Takashi Suzuki It is certified that error appears in the above-identified patent and that said Letters Patent is hereby corrected as shown below:

| Column | Line | |
|---|---|---|
| 21 | 24 | After "based" insert --on--. |

Signed and Sealed this  
First Day of March, 2011

David J. Kappos  
*Director of the United States Patent and Trademark Office*